(12) United States Patent
Wischnewskiy

(10) Patent No.: US 9,391,542 B2
(45) Date of Patent: Jul. 12, 2016

(54) ULTRASONIC ACTUATOR FOR A LINEAR ULTRASONIC MOTOR AND LINEAR ULTRASONIC MOTOR HAVING AN ULTRASONIC ACTUATOR

(71) Applicant: Physik Instrumente (PI) GmbH & Co. KG, Karlsruhe (DE)

(72) Inventor: Wladimir Wischnewskiy, Waldbronn (DE)

(73) Assignee: Physik Instrumente (PI) GmbH & Co. KG, Karlsruhe (DE)

( * ) Notice: Subject to any disclaimer, the term of this patent is extended or adjusted under 35 U.S.C. 154(b) by 419 days.

(21) Appl. No.: 14/077,378

(22) Filed: Nov. 12, 2013

(65) Prior Publication Data

US 2014/0175946 A1 Jun. 26, 2014

(30) Foreign Application Priority Data

Nov. 12, 2012 (DE) .......................... 10 2012 022 146

(51) Int. Cl.
*H02N 2/00* (2006.01)
*H01L 41/09* (2006.01)
*H02N 2/08* (2006.01)

(52) U.S. Cl.
CPC ...................................... *H02N 2/08* (2013.01)

(58) Field of Classification Search
USPC .................................................. 310/311–371
See application file for complete search history.

(56) References Cited

U.S. PATENT DOCUMENTS

| 4,562,374 | A | | 12/1985 | Sashida | |
|---|---|---|---|---|---|
| 4,742,260 | A | * | 5/1988 | Shimizu | H02N 2/103 310/323.16 |
| 5,783,899 | A | | 7/1998 | Okazaki | |
| 6,380,661 | B1 | * | 4/2002 | Henderson | H02N 2/023 310/323.02 |
| 2003/0006675 | A1 | * | 1/2003 | Bartzke | H02N 2/025 310/328 |
| 2003/0165022 | A1 | * | 9/2003 | Sasaki | G02B 7/102 359/694 |

(Continued)

FOREIGN PATENT DOCUMENTS

| DE | 10158920 A1 * | 6/2003 | ............. H01L 41/09 |
|---|---|---|---|
| DE | 102004059429 | 7/2006 | |

(Continued)

OTHER PUBLICATIONS

Atsuo Kawamura et al., Linear Ultrasonic Piezoelectric Actuator, IEEE Transactions on Industry Applications, Jan./Feb. 1991, pp. 23-27, vol. 27, No. 1, IEEE, New York, US.

*Primary Examiner* — Thomas Dougherty
(74) *Attorney, Agent, or Firm* — Scott D. Smiley; The Concept Law Group, P.A.

(57) ABSTRACT

An ultrasonic actuator includes at least one primary waveguide resonator, with each primary generator being in flat, at least one auxiliary waveguide resonator, with each auxiliary generator being in contact in order to form an acoustic standing wave, at least one crosspiece that connects one of the at least one primary waveguide resonators and one of the at least one auxiliary waveguide resonators to each other at least in sections, and wherein at least one friction track or friction rail is arranged on the crosspiece wherein the at least one primary waveguide resonator and the at least one auxiliary waveguide resonator is an open linear waveguide, and the at least one crosspiece functions as a totalizing device of the acoustic standing waves propagated in the primary and auxiliary waveguide resonators, so that the at least one crosspiece functions as the generator of a simulated travelling wave.

14 Claims, 16 Drawing Sheets

(56) References Cited

U.S. PATENT DOCUMENTS

2004/0263108 A1* 12/2004 Lim .................. B23Q 1/012 318/640
2008/0073999 A1 3/2008 Wischnewskij et al.
2009/0021857 A1* 1/2009 Shelor ................ G11B 5/4826 360/77.16
2010/0031856 A1* 2/2010 Shoda .................... B60L 5/005 108/21

FOREIGN PATENT DOCUMENTS

EP 0601671 6/1994
JP 63-148877 A 6/1988

* cited by examiner

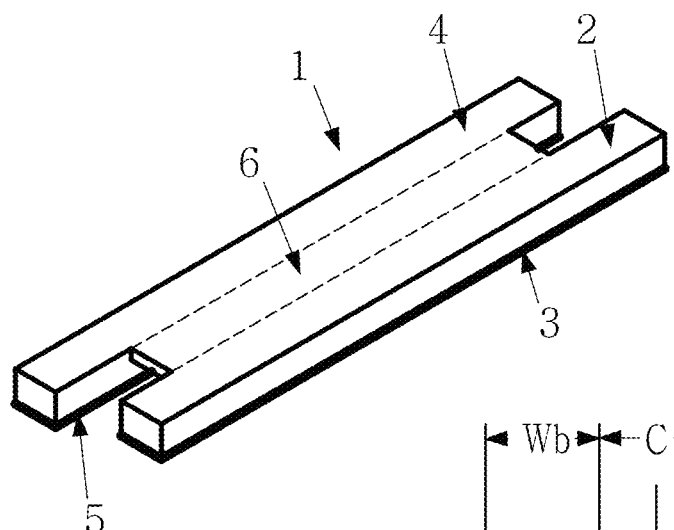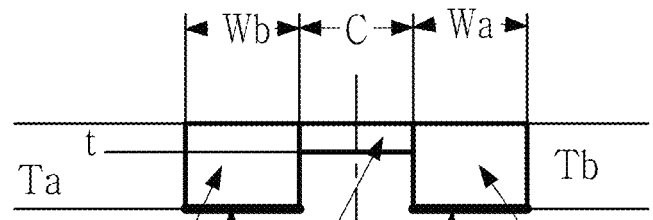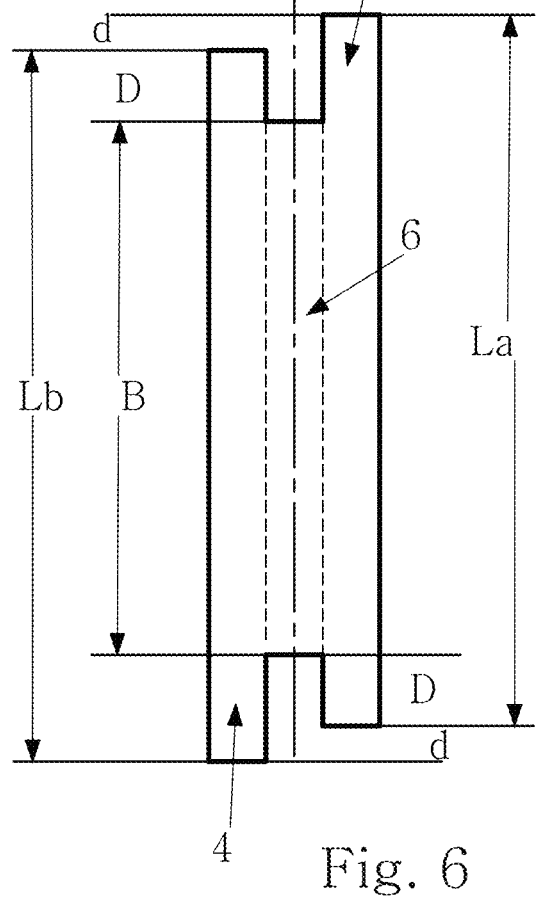
Fig. 5
Fig. 7
Fig. 8
Fig. 6

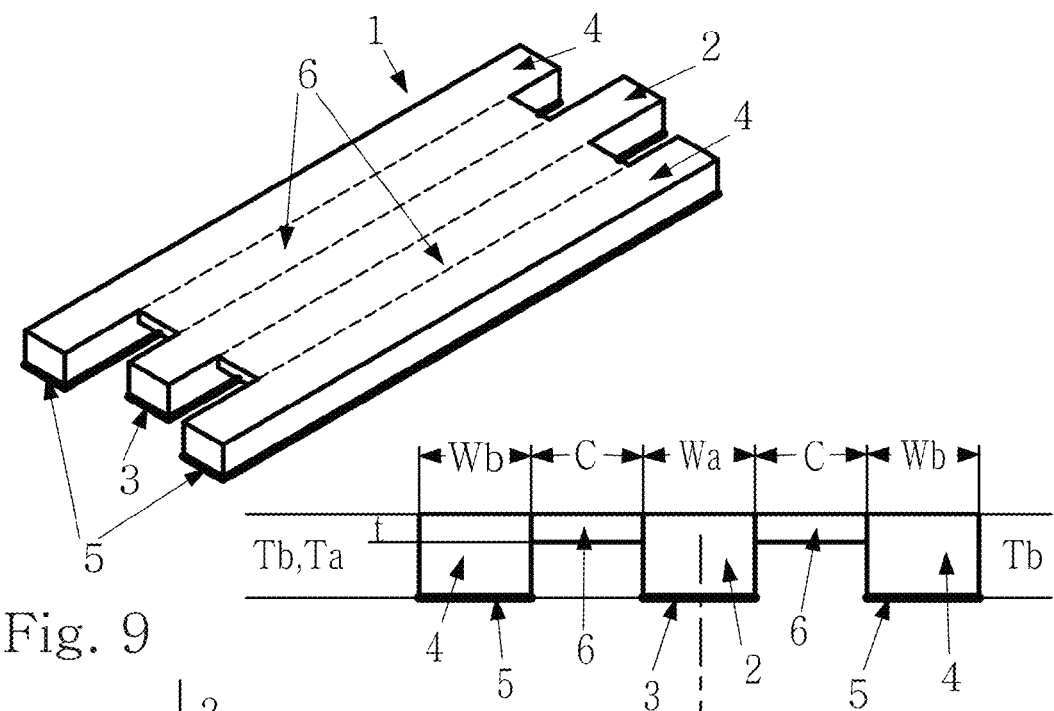
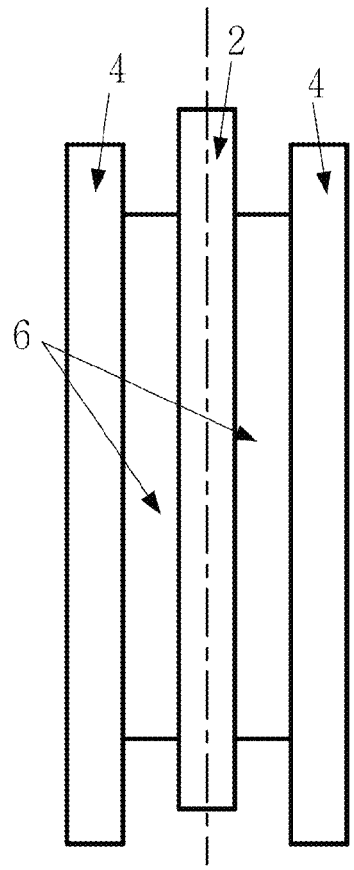
Fig. 12
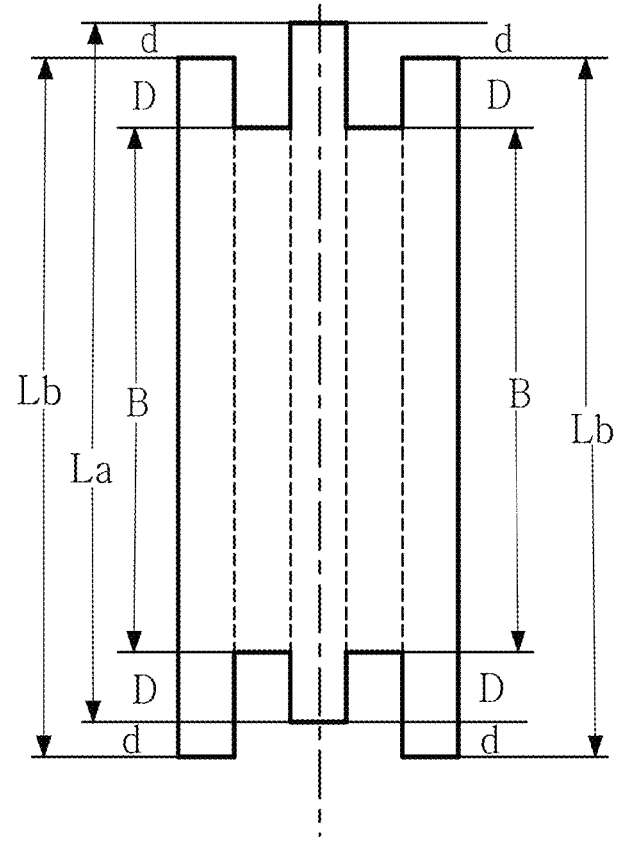
Fig. 9
Fig. 11
Fig. 10

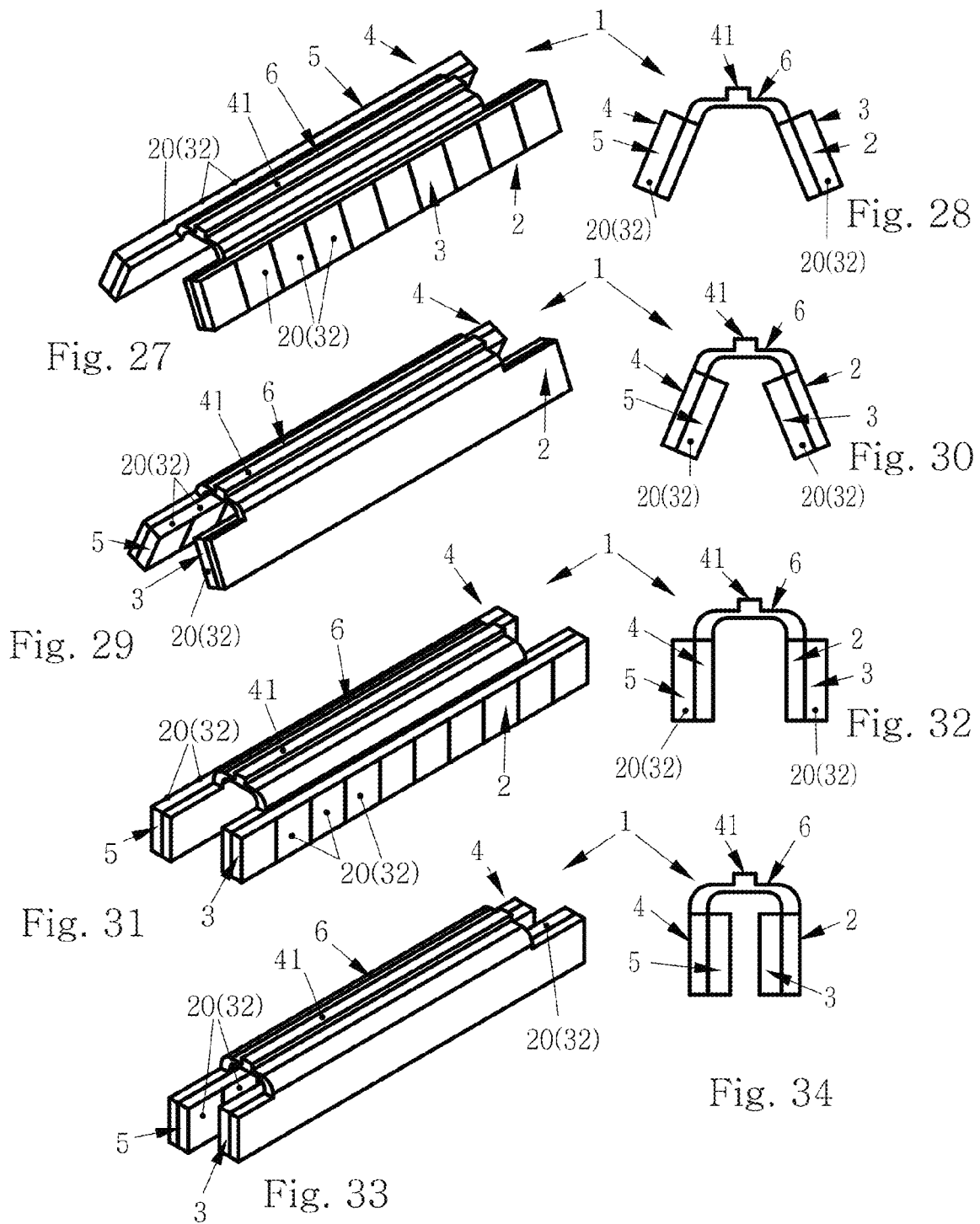

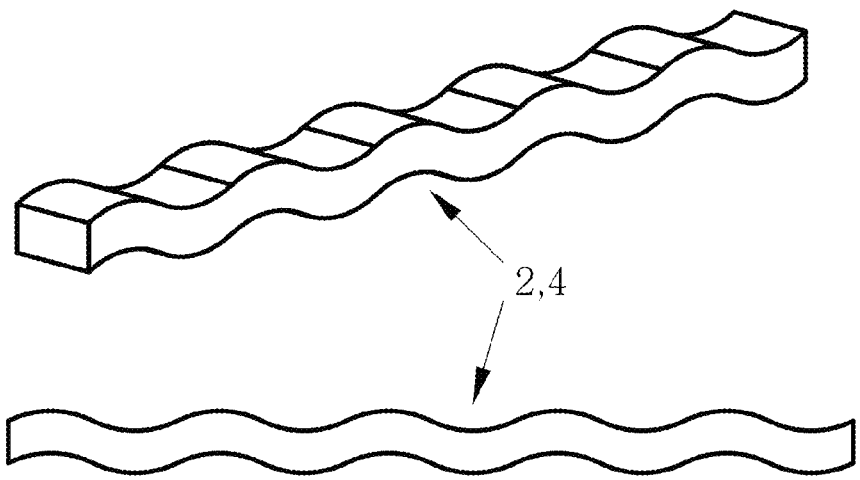
Fig. 45
Fig. 46
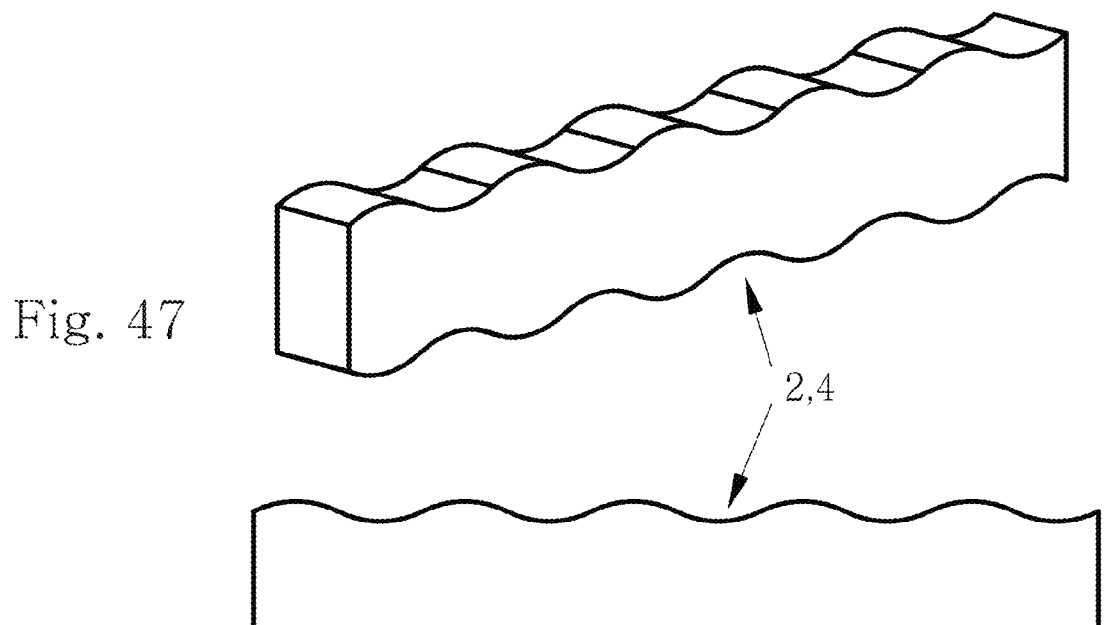
Fig. 47
Fig. 48

ULTRASONIC ACTUATOR FOR A LINEAR ULTRASONIC MOTOR AND LINEAR ULTRASONIC MOTOR HAVING AN ULTRASONIC ACTUATOR

FIELD OF THE INVENTION

The invention relates to an ultrasonic actuator for a linear ultrasonic motor and a linear ultrasonic motor having an ultrasonic actuator.

BACKGROUND OF THE INVENTION

Ultrasonic linear motors with acoustic travelling waves propagating inside closed waveguides are known from U.S. Pat. No. 4,978,882 and U.S. Pat. No. 5,155,407. These waveguides are oval in shape and thus have two straight and two rounded sections.

SUMMARY OF THE INVENTION

The object of the invention is to provide an ultrasonic actuator for a linear ultrasonic motor having simulated travelling waves, which may be created with the ultrasonic actuator with the smallest dimensions possible, and with which the maximum speed of the element driven by the ultrasonic motor, the tractive force of the ultrasonic motor, the mechanical performance of the ultrasonic motor and the efficiency thereof may be increased while also expanding the possible field of application of the ultrasonic motor.

This object is solved with the features of the independent claims. Additional embodiments are described in the subordinate claims relating thereto.

According to the invention, an ultrasonic actuator is provided for a linear ultrasonic motor having simulated travelling waves, which may be designed as a precision miniature drive unit. The ultrasonic motor according to the invention may be used as a drive unit in optical systems, as a drive unit for precision technological translation stages or precision technological positioning units, and in other apparatuses in which small displacement steps are called for, and in high-precision positioning units when rapid position changes are necessary.

In the ultrasonic actuator according to the invention, the waveguide is routed in such manner that a straight section thereof is not needed, so that the ultrasonic motor according to the invention may be constructed with very small dimensions.

The routing of the waveguide in the ultrasonic actuator according to the invention is further provided in such manner that an arcuate or curved section of the waveguide is not needed, so that the acoustic travelling wave is not distorted by the shape of the waveguide. In this way, significant inhomogeneity in the elliptical trajectory of the straight section of the oval waveguide and additional energy losses due to frictional contact with the motor resulting therefrom are avoided. Thus, the maximum speed of the element driven by the ultrasonic motor according to the invention, the maximum tractive force of the ultrasonic motor according to the invention, and the mechanical performance and efficiency thereof are improved.

Consequently, this opens up a wide range of application areas for the ultrasonic motor according to the invention.

Each primary generator actuates a primary waveguide resonator arranged thereon in such manner that it generates primary travelling waves, while each auxiliary generator actuates an auxiliary waveguide resonator arranged thereon in such manner that it generates simulated travelling waves. Each primary waveguide resonator is connected in motion-coupled manner via a crosspiece to each of the at least one auxiliary waveguide resonators provided in the ultrasonic actuator.

The primary generator preferably has a plate-like or bar-like construction, and primary waveguide resonator 2, auxiliary generator 5 and auxiliary waveguide resonator 4 may also be advantageously constructed as a plate or a bar. Primary generator 3 and at least one auxiliary generator 5 may each be constructed from a plurality of sub-generators, which are positioned along the lengthwise direction of the a primary waveguide resonator or auxiliary waveguide resonator. In this case they may be attached or arranged both on a lower surface relative to a vertical direction of the ultrasonic actuator, an upper surface opposite thereto, or on both surfaces of the respective primary waveguide resonator or auxiliary waveguide resonator.

According to the invention, an ultrasonic actuator is provided for a linear ultrasonic motor for driving a positioning element, which is pressed along at least one friction track with a predefined force in the ultrasonic motor to effect a linear movement thereof. The ultrasonic actuator comprises:
- at least one primary waveguide resonator, with each of which one primary generator is in flat contact in order to form an acoustic standing wave,
- at least one auxiliary waveguide resonator, with each of which one auxiliary generator is in contact in order to form an acoustic standing wave,
- at least one crosspiece, wherein each of the at least one crosspieces connects one of the at least one primary waveguide resonators and one of the at least one auxiliary waveguide resonators to each other at least in sections, and wherein at least one friction track or friction rail is arranged on the crosspiece,
wherein the at least one primary waveguide resonator and the at least one auxiliary waveguide resonator is/are designed as an open linear waveguide, and the at least one crosspiece functions as a totalising device of the acoustic standing waves propagated in the primary and auxiliary waveguide resonators, so that the at least one crosspiece functions as the generator of a simulated travelling wave, which is usable for driving the positioning element.

In particular, the ultrasonic actuator comprises:
at least one plate- or bar-like primary waveguide resonator, with each of which a plate- or bar-like primary generator is in flat connection in order to form an acoustic standing wave,
at least one plate- or bar-like auxiliary waveguide resonator, with each of which a plate- or bar-like auxiliary generator is connected in order to form an acoustic standing wave,
at least one crosspiece, wherein each of the at least one crosspieces connects a connecting section of the at least one primary waveguide resonators and a connecting section of the at least one auxiliary waveguide resonators to each other at least in sections, wherein the connecting sections are facing toward each other and wherein at least one friction track or friction rail is arranged on the crosspiece,
wherein the at least one primary waveguide resonator and the at least one auxiliary waveguide resonator is/are designed as an open linear waveguide, and the at least one crosspiece functions as a totalising device of the acoustic standing waves propagated in the primary and auxiliary waveguide resonators, so that the at least one crosspiece functions as the generator of a simulated travelling wave, which is usable for driving the positioning element.

According to one embodiment of the ultrasonic actuator according to the invention, it is provided that the length of the primary waveguide resonator is equal to an integral multiple of half the wavelength of the acoustic standing wave generated therein, and the length of the auxiliary wave resonator is equal to the length of the primary waveguide resonator, wherein the auxiliary waveguide resonator is spatially offset relative to the primary waveguide resonator by a quarter of the wavelength of the generated acoustic standing wave, and the crosspiece is shorter than the primary waveguide resonator by one and one quarter times the wavelength of the generated acoustic standing wave.

According to one embodiment of the ultrasonic actuator according to the invention, it is provided that the ultrasonic actuator contains two or more primary waveguide resonators and a corresponding number of auxiliary waveguide resonators with crosspieces, which set the positioning element in motion.

According to one embodiment of the ultrasonic actuator according to the invention, it is provided that acoustic bending standing waves or acoustic longitudinal standing waves or acoustic standing shear waves or other acoustic standing waves having the same frequency are generated in the primary and auxiliary waveguide resonators, and are propagated along the length of the resonators.

According to one embodiment of the ultrasonic actuator according to the invention, it is provided that the width of each crosspiece is smaller than or equal to half the wavelength of the generated acoustic standing wave.

According to one embodiment of the ultrasonic actuator according to the invention, it is provided that the thickness of the crosspiece is smaller than or equal to a quarter of the wavelength of the generated standing wave.

According to one embodiment of the ultrasonic actuator according to the invention, it is provided that the primary and auxiliary waveguide resonators of the acoustic standing waves are constructed from metal, metal ceramic, oxide ceramic, Sital or glass as passive waveguide resonators, and represent the generators for the acoustic waves of the piezo-elements connected to these resonators. Alternatively, according to another embodiment of the ultrasonic actuator according to the invention, it may be provided that the primary and auxiliary resonators of the acoustic standing waves are constructed from piezoceramic as active waveguide resonators, and the generators of the acoustic waves have the form of electrodes applied to the surfaces of the piezoelectric resonators, or are arranged inside said resonators.

According to one embodiment of the ultrasonic actuator according to the invention, it is provided that the crosspiece is made from the same material as the primary and auxiliary waveguide resonators. Alternatively, according to another embodiment of the inventive ultrasonic actuator, it may be provided that the crosspiece is made from a different material from the primary and auxiliary waveguide resonators.

According to one embodiment of the ultrasonic actuator according to the invention, it is provided that the crosspiece comprises at least one friction track or friction rail.

According to one embodiment of the ultrasonic actuator according to the invention, it is provided that the friction guide rail has a rectangular or triangular or trapezoidal shape or is round.

According to one embodiment of the ultrasonic actuator according to the invention, it is provided that the friction track or friction rail is furnished with transverse slots.

According to one embodiment of the ultrasonic actuator according to the invention, it is provided that the ultrasonic actuator has a V or U shape.

According to one embodiment of the ultrasonic actuator according to the invention, it is provided that the ultrasonic actuator comprises fastening elements that are connected both to the waveguide resonators in the minima of the vibration speeds thereof and to a holder of the ultrasonic actuator.

Alternatively, according to another embodiment of the ultrasonic actuator according to the invention it may be provided that the ultrasonic actuator comprises fastening elements that are connected both to the frontal faces of the waveguide resonators and to the holder of the ultrasonic actuator.

According to one embodiment of the ultrasonic actuator according to the invention, it is provided that the ultrasonic actuator is connected to the holder of the ultrasonic actuator via the frontal faces of the waveguide resonators.

According to one embodiment of the ultrasonic actuator according to the invention, it is provided that the holder of the ultrasonic actuator represents a frame that encloses the ultrasonic actuator or the motor housing.

According to one embodiment of the ultrasonic actuator according to the invention, it is provided that the positioning element comprises one or more friction layers that is/are in operative connection with the friction track or the friction guide rail.

According to one embodiment of the ultrasonic actuator according to the invention, it is provided that an electric exciter device supplies two periodic voltages of the same frequency for the electrical excitation of the primary and auxiliary generators, wherein said frequency is the same as the frequency of the generated acoustic wave and are phase-shifted with respect to each other by an angle of +90 degrees or −90 degrees.

According to one embodiment of the ultrasonic actuator according to the inventions, it is provided that the electric excitation device supplies four periodic voltages of the same frequency, wherein said frequency is the same as the frequency of the generated acoustic wave and two thereof are phase-shifted with respect to each other by an angle of +90 degrees or −90 degrees and the other two are in phase opposition thereto.

According to a further aspect of the invention, a linear ultrasonic motor is provided that comprises an ultrasonic actuator according to the invention and a positioning element, wherein the positioning element may be set in linear motion by the ultrasonic actuator, and the ultrasonic motor further comprises a guidance device for guiding the positioning element therein.

BRIEF DESCRIPTION OF THE DRAWINGS

In the following, embodiments of the invention will be described with reference to the accompanying drawing, in which:

FIGS. 5 to 8 are representations of the primary waveguide resonator and the auxiliary waveguide resonator of FIG. 1, in which the relative lengths of the primary waveguide resonator, the auxiliary waveguide resonator and the crosspiece are shown;

FIGS. 9 to 12 are representations of the primary waveguide resonators and the auxiliary waveguide resonators of FIG. 2, in which the relative lengths of the primary waveguide resonators, the auxiliary waveguide resonators and the crosspieces are shown;

FIGS. 27 and 28 are representations of a further embodiment of the ultrasonic actuator according to the invention, which is comparable in terms of the number of primary or auxiliary waveguide resonators to the embodiment of the ultrasonic actuator of FIG. 1, and creates a V-shaped front view with respect thereto;

FIGS. 29 and 30 are representations of a further embodiment of the ultrasonic actuator according to the invention, which is comparable in terms of the number of primary or auxiliary waveguide resonators to the embodiment of the ultrasonic actuator of FIG. 1, and creates a V-shaped front view with respect thereto;

FIGS. 31 and 32 are representations of a further embodiment of the ultrasonic actuator according to the invention, which is comparable in terms of the number of primary or auxiliary waveguide resonators to the embodiment of the ultrasonic actuator of FIG. 1, and creates a U-shaped front view with respect thereto;

FIGS. 33 and 34 are representations of a further embodiment of the ultrasonic actuator according to the invention, which is comparable in terms of the number of primary or auxiliary waveguide resonators to the embodiment of the ultrasonic actuator of FIG. 1, and creates a U-shaped front view with respect thereto;

FIG. 45 is a perspective representation of a primary waveguide resonators or auxiliary waveguide resonator in a phase with maximum deformation for propagation of an acoustic bending standing wave with the respective resonator;

FIG. 46 is a side view of a primary waveguide resonator or an auxiliary waveguide resonator in the state shown in FIG. 45;

FIG. 47 is a perspective representation of a primary waveguide resonator or an auxiliary waveguide resonator in a deformation phase for a normal cross section of ultrasonic actuator 1 when generating an acoustic bending standing wave with the respective resonator;

FIG. 48 is a side view of a primary waveguide resonator or an auxiliary waveguide resonator in the state shown in FIG. 47;

DETAILED DESCRIPTION

Figure 1:
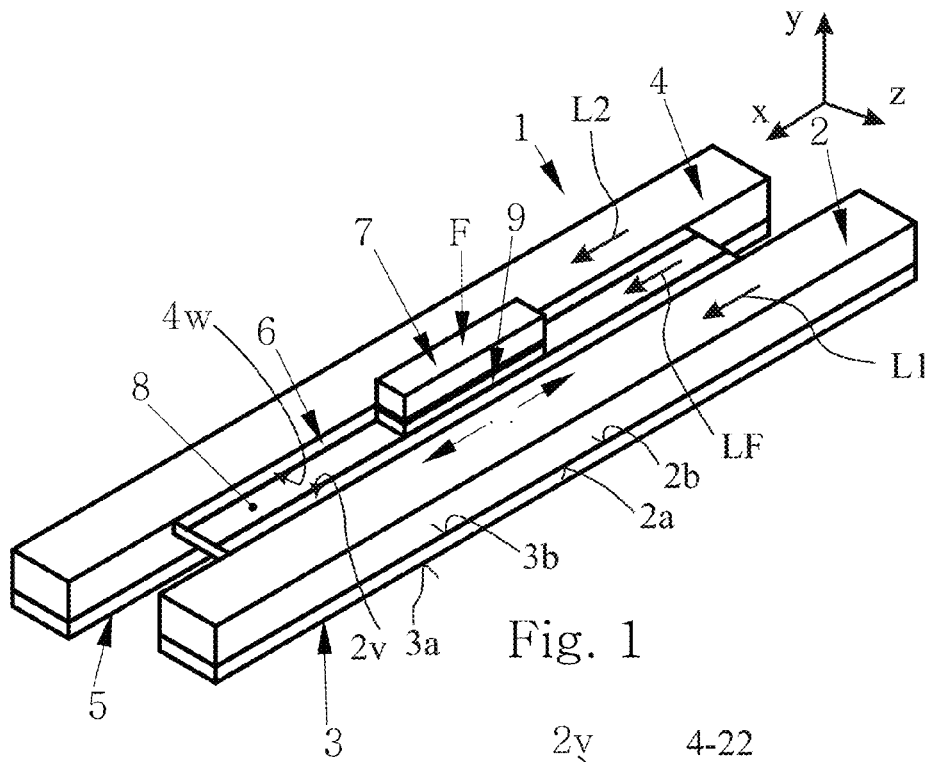
FIG. 1 shows a first embodiment of the ultrasonic actuator according to the invention for use for an ultrasonic motor having a primary waveguide resonator and an auxiliary waveguide resonator, and a crosspiece positioned therebetween for driving a positioning element of the ultrasonic motor.

Ultrasonic actuator 1 according to the invention is provided for an ultrasonic motor. Ultrasonic actuator 1, of which a simple embodiment is shown in FIG. 1, comprises a primary generator 3 and a passive primary waveguide resonator 2 connected thereto, and an auxiliary generator 5 and a passive auxiliary waveguide resonator 4 connected thereto.

As appears in the figures, in the embodiments of ultrasonic actuator 1 the primary generator and the auxiliary generator in particular are each in the form of plates or bars.

The ultrasonic motor is created from ultrasonic actuator 1 and positioning element 7, which represents the power output of the ultrasonic motor and thus represents an element driven by ultrasonic actuator 1 when the ultrasonic motor is in the active state. The ultrasonic motor further comprises a first electrical excitation device for primary generator 3 and a second electrical excitation device for auxiliary generator 5. Alternatively, the first and second electrical excitation devices may have the form of a single electrical excitation device. FIG. 1 also shows a coordinate system of ultrasonic actuator 1 with a lengthwise direction X, a width direction Y and a height direction Z.

In the figures, a primary generator is generally indicated with reference sign "3", and a primary waveguide resonator is generally indicated with reference sign "2". As is shown in FIG. 1, primary generator 3 is in the form of a plate or bar, and comprises a bottom surface 3a relative to a height direction Z and a top surface 3b situated opposite bottom surface 3a. Primary waveguide resonator 2 is also in the form of a plate or bar, and also comprises a bottom surface 2a relative to a height direction Z of ultrasonic actuator 1 and a top surface 2b situated opposite bottom surface 2a. Bottom surface 2a of primary waveguide resonator 2 is in flat connection with upper surface 3b of main generator 3, so that in response to a corresponding dynamic deformation of main generator 3 an acoustic standing wave may be generated in primary waveguide resonator 2 and formed in the lengthwise direction thereof.

Ultrasonic actuator 1 also comprises a passive auxiliary waveguide resonator 4 and an auxiliary generator 5, which actuates auxiliary waveguide resonator 4 to form a simulated travelling wave. In the figures, an auxiliary generator denoted generally with reference sign "5", and an auxiliary waveguide resonator is denoted generally with reference sign "4". Auxiliary generator 5 has the form of a plate or bar, and comprises a bottom surface 5a relative to a height direction Z of ultrasonic actuator 1 and a top surface 5b situated opposite bottom surface 5a. Auxiliary waveguide resonator 4 also has the form of a plate or bar and comprises a bottom surface 4a and a top surface 4b situated opposite bottom surface 4a. Bottom surface 4a of auxiliary waveguide resonator 4 is in flat contact with top surface 5b of auxiliary generator 5, so that in response to a corresponding dynamic deformation of auxiliary generator 5 an acoustic standing wave may be generated in auxiliary waveguide resonator 4 and formed in the lengthwise direction thereof.

Primary waveguide resonator 2 and auxiliary waveguide resonator 4 are each constructed as open linear waveguide resonators, which are able to form waves along the respective longitudinal directions L1, L2 thereof by virtue of their mobility. Lengthwise directions L1, L2, LF in particular may each extend in the direction of the X axis. Lengthwise directions L1, L2, LF may particular be defined as the directions of the connecting lines of the area centroids of the cross-sectional areas of the respective bodies, e.g., of primary waveguide resonator 2 or auxiliary waveguide resonator 4, wherein particularly the cross-sectional areas that extend transversely to the operating direction of positioning element 7 and which are the respectively smallest cross-sectional area in terms of the modulus at the respective point of the respective body may be used as the cross-sectional areas for this. A crosspiece 6 is arranged on connecting sections 2v, 4w of primary waveguide resonator 2 and auxiliary waveguide resonator 4, which face one another, along the respective longitudinal directions L1 and L2 thereof, so that crosspiece 6 is able to absorb movements of primary waveguide resonator 2 and auxiliary waveguide resonator 4. A movement of primary waveguide resonator 2 and auxiliary waveguide resonator 4 thus causes the acoustic standing waves propagating in primary and auxiliary waveguide resonators 2 and 4 to be superimposed on each other in crosspiece 6, so that crosspiece 6 functions as a totalising device for the two acoustic standing waves. The superposition of the acoustic standing waves of primary waveguide resonator 2 and auxiliary waveguide resonator 4 in crosspiece create an acoustic simulated travelling wave in the crosspiece, which may be used to drive the positioning element. Crosspiece 6 thus functions as a generator of the acoustic simulated travelling wave.

Generally, connecting sections 2v, 4w may extend in the respective longitudinal direction L1 or L2 over the overall length of primary waveguide resonator 2 or auxiliary waveguide resonator 4. Alternatively, connecting sections 2v, 4w extend over only a part of the overall length of primary waveguide resonator 2 or auxiliary waveguide resonator 4 in the respective longitudinal direction L1 or L2, as is shown in FIG. 1. In this case, connecting sections 2v, 4w extend in the respective longitudinal direction L1 or L2 for more than a quarter, and preferably more than a half, and particularly preferably more than two thirds of the overall length of primary waveguide resonator 2 or auxiliary waveguide resonator 4. Connecting sections 2v, 4w are preferably positioned centrally on primary waveguide resonator 2 and auxiliary waveguide resonator 4, as shown in FIG. 1.

Crosspiece 6 further comprises a friction track 8, with which a positioning element 7 of the ultrasonic motor is driven to perform a linear movement by pressing against the friction rail or friction track 8 with a force F. The device of the motor or the device coupled to an output component of the motor, with which positioning element 7 is pressed against the friction rail or friction track 8, may particularly be constructed according to the prior art. Positioning element 7 and the friction rail are thus in operative or frictional contact. As a component of crosspiece 6, friction track 8 extends at least along sections in the lengthwise directions L1, L2 of primary waveguide resonator 2 and auxiliary waveguide resonator 4. A frictional layer 9 is applied to positioning element 7, with which positioning element 7 is in contact with friction track 8, and with which positioning element 7 is in operative connection or frictional contact, so that it is set into linear motion when generators 3, 5 are activated. In the figures, a crosspiece is generally denoted with reference sign "6", a friction track is generally provided with reference sign "8" and a friction layer is generally provided with reference sign "9".

The ultrasonic motor comprises a frame or housing (not shown in the figures), in which ultrasonic actuator 1 is supported. Ultrasonic actuator 1 further comprises a guidance device arranged on the frame or housing, in which the driven element 7 is guided with respect to the frame or housing as it executes the movement induced by ultrasonic actuator 1.

In one embodiment of the invention, it may be provided that force F, with which positioning element 7 is pressed against the friction rail, is generated by the weight force of positioning element 7 alone. In this case, the guidance device is designed in such manner that positioning element 7 is retained against the guidance device by means of a pickup device, which supports positioning element 7 on the guidance device with a degree of translational freedom, that allows positioning element 7 to move transversely to the lengthwise extension thereof, or to the respective local lengthwise direction LF of friction track 8, so that positioning element 7 is pressed against friction track 8 by its own weight force.

In a further embodiment of the invention, it may be provided that a biasing device, such as a spring, is attached to the accommodation device on which positioning element 7 on the guidance device is supported with a degree of translational freedom permitting movement of positioning element 7 transversely to the lengthwise direction or the respective local lengthwise direction LF of friction track 8, in such manner that said biasing device exerts a spring force on positioning element 7 transversely to the lengthwise direction or the respective local lengthwise direction LF of friction track 8, so that positioning element 7 presses against friction track 8 with a predefined spring force. Alternatively or additionally to the biasing device, a magnet may be attached to the guidance device, wherein the magnet is arranged on the guidance device and exerts ferromagnetic influence on positioning element 7 in such manner that positioning element 7 is pressed against friction track 8 with a predetermined force. Generally, therefore, in these embodiments a force generating device is arranged on the guidance device that presses positioning element 7 against friction track 8 with a predefined force.

Figure 2:
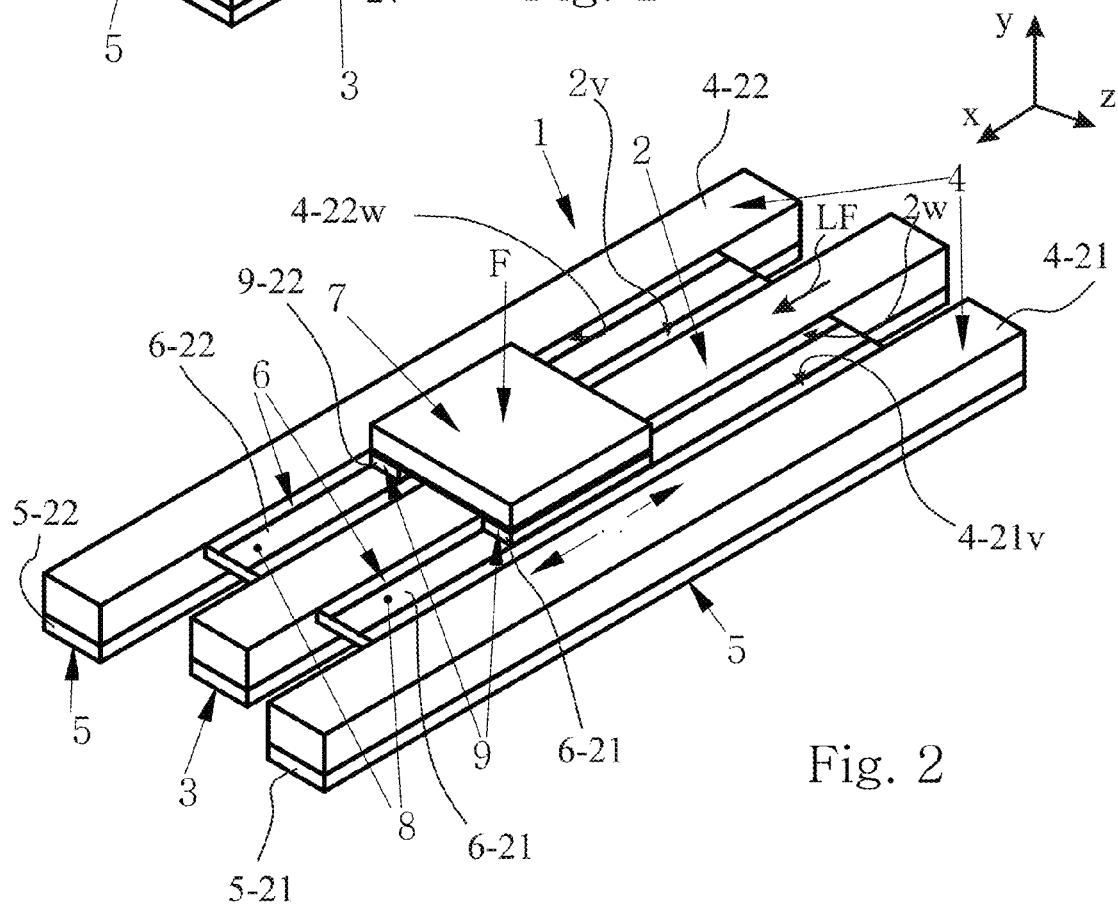
FIG. 2 shows a further embodiment of the ultrasonic actuator according to the invention with one primary waveguide resonator, two auxiliary waveguide resonators and two crosspieces.

FIG. 2 shows an ultrasonic motor with a primary waveguide resonator 2 with which a primary generator 3 is in flat contact, two auxiliary waveguide resonators 4, which are indicated specifically in FIG. 2 by reference signs 4-21 and 4-22, and with each of which an auxiliary generator 5-21 and 5-22 is in flat contact, and two crosspieces 6, which are indicated specifically in FIG. 2 by reference signs 6-21 and 6-22. In this context, a first crosspiece 6-21, and a first auxiliary waveguide resonator 4-21 attached thereto, is connected to a first side of primary waveguide resonators 2 in such manner that first crosspiece 6-21 is located between primary waveguide resonator 2 and first auxiliary waveguide resonator 4-21. Moreover, a second crosspiece 6-22 and a second auxiliary waveguide resonator 4-22 attached thereto, is connected to a second side of primary waveguide resonator 2, situated opposite the first side in direction Y, in such manner that second crosspiece 6-22 is situated between primary waveguide resonator 2 and second auxiliary waveguide resonator 4-22. Additionally, a friction track 8-21 or 8-22 is arranged on each crosspiece 6-21, 6-22. Also, two friction layers 9-21, 9-22 are arranged on positioning element 7 in such manner that when positioning element 7 is in the operating state one each of friction layers 9-21, 9-22 bears on each of friction tracks 8-21 and 8-22, and is in operative connection or frictional contact therewith.

In FIG. 2,
the connecting section of first auxiliary waveguide resonator 4-21 for connection thereof to first crosspiece 6-21 is designated with reference sign 4-21v,
the connecting section of primary waveguide resonator 2 for connection thereof to first crosspiece 6-21 is designated with reference sign 2w the connecting section of second auxiliary waveguide resonator 4-22 for connection thereof to second crosspiece 6-22 is designated with reference sign 4-21w, and
the connecting section of primary waveguide resonator 2 for connection thereof to second crosspiece 6-22 is designated with reference sign 2w.

Generally, and thus particularly with regard to the embodiment of ultrasonic actuator 1, connecting sections 4-21v, 2w and/or 2v, 4-22w may extend over the full length of the respective primary waveguide resonator and the auxiliary waveguide resonator in the respective lengthwise direction L1 or L2 thereof, or along the X axis of the coordinate system used in the figures. Alternatively, as shown in FIG. 2, connecting sections 4-21v, 2w and/or 2v, 4-22w extend over only a part of the overall length of primary waveguide resonator 2 and auxiliary waveguide resonator 4-21, 4-22, in the respective lengthwise direction L1 and L2, or along the X axis. In this case, connecting sections 4-21v, 2w and/or 2v, 4-22w may extend over more than a quarter, and preferably more than half, and particularly preferably more than two thirds of the overall length of primary waveguide resonator 2 and auxiliary waveguide resonator 4-21, 4-22 in the respective longitudinal direction L1 or L2. As shown in FIG. 1, connecting sections 4-21v, 2w and/or 2v, 4-22w are positioned in the middle of primary waveguide resonator 2 and auxiliary waveguide resonator 4-21, 4-22.

Accordingly, ultrasonic actuator 1 comprises:
at least one plate- or rod-shaped primary waveguide resonator 2, with each of which a plate- or rod-shaped primary generator 3 is in flat contact in order to form an acoustic standing wave,
at least one plate- or rod-shaped auxiliary waveguide resonator 4, with each of which a plate- or rod-shaped auxiliary generator 3 is in flat contact in order to form an acoustic standing wave,
at least one crosspiece (6), wherein each of the at least one crosspieces (6) connects a connecting section of the at least one primary waveguide resonators (2) and a connecting section of the at least one auxiliary waveguide resonators (4) at least in sections, wherein the connecting sections face one another and wherein at least one friction track (8) or friction rail (41) is arranged on the crosspiece.

The at least one primary waveguide resonator 2 and the at least one auxiliary waveguide resonator 4 in ultrasonic actuator 1 may each be constructed as open linear waveguides. In ultrasonic actuator 1, the at least one crosspiece 6 functions as a totalizer of the acoustic standing waves propagating in primary and auxiliary waveguide resonators 2, 4, so that the at least one crosspiece 6 serves as a generator for a simulated travelling wave, which is usable for driving positioning element 7.

Figure 3:
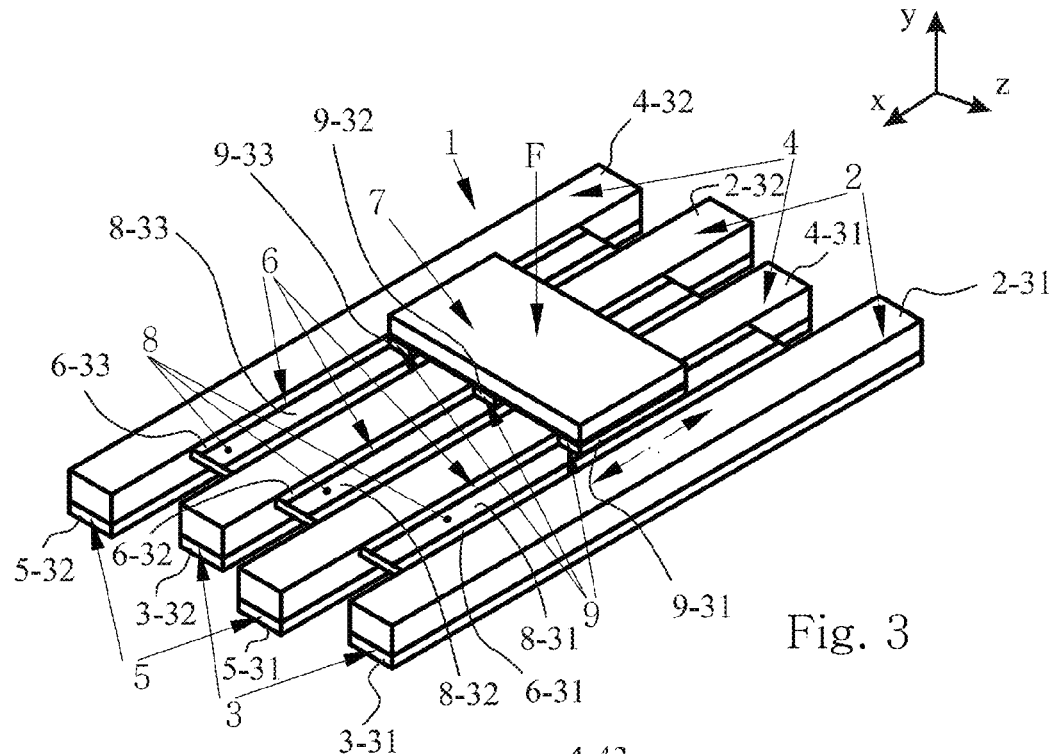
FIG. 3 shows a further embodiment of the ultrasonic actuator according to the invention with two primary waveguide resonators, two auxiliary waveguide resonators and three crosspieces.

FIG. 3 shows an ultrasonic motor having two primary waveguide resonators 2, two auxiliary waveguide resonators 4 and three crosspieces 6, on each of which a friction track 8 is arranged. Positioning element 7 comprises three friction layers 9, which are also denoted indicated in this case by reference signs 9-31, 9-32, 9-33.

In detail, in the embodiment of an ultrasonic actuator 1 represented in FIG. 3, a first primary waveguide resonator 2-31, a first auxiliary waveguide resonator 4-31, a second primary waveguide resonator 2-31 and a second auxiliary waveguide resonator 4-32, are arranged alternatingly when viewed in the Y direction so that first auxiliary waveguide resonator 4-31 is arranged between first and second primary waveguide resonators 2-31, 2-32. One primary generator 3-31 or 3-32 is in flat contact with each of first primary waveguide resonators 2-31, 2-32 and one auxiliary generator 5-31 or 5-32 is in flat contact with each of auxiliary waveguide resonators 4-31 and 4-32. One primary waveguide resonator and one auxiliary waveguide resonator are each connected via one crosspiece, so three crosspieces 6-31, 6-32 and 6-33 are provided.

First auxiliary waveguide resonator 4-31 is connected with reference to the Y direction laterally in a first direction (positive Y direction) to a first friction track 8-31 on first primary waveguide resonator 2-31 via a first crosspiece 6-31, and laterally in a second direction, opposite to the first direction (negative Y direction) to a second friction track 8-32 on second primary waveguide resonator 2-32 via a second crosspiece 6-32, so that first crosspiece 6-31 is situated between first primary waveguide resonator 2-31 and first auxiliary waveguide resonator 4-31. Second primary waveguide resonator 2-32 is also connected to first auxiliary waveguide resonator 4-31 via second Crosspiece 6-32 and to second auxiliary waveguide resonator 4-32 via third crosspiece 6-33, so that third crosspiece 6-33 is situated between second primary waveguide resonator 2-32 and second auxiliary waveguide resonator 4-32.

Positioning element 7 further comprises three friction layers 9-31, 9-32, 9-33, which are arranged such that, when positioning element 7 is in the operating state, friction layers 9-31, 9-32, 9-33 are each supported respectively on a friction track 8-31 or 8-32 or 8-33, and are in operative connection and frictional contact therewith.

Figure 4:
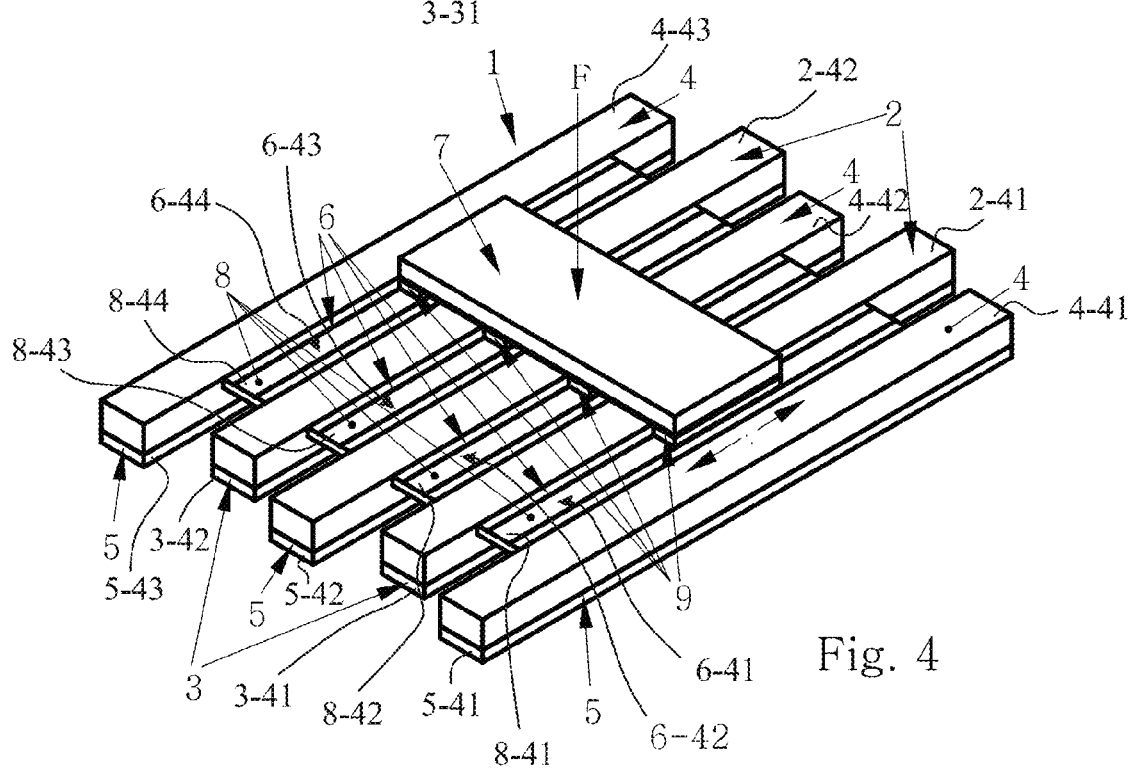
FIG. 4 shows a further embodiment of the ultrasonic actuator according to the invention with two primary waveguide resonators, three auxiliary waveguide resonators and four crosspieces.

FIG. 4 shows an ultrasonic motor having two primary waveguide resonators 2, three auxiliary waveguide resonators 4 and four crosspieces 6, each with one friction track 8 arranged thereon. The positioning element comprises four friction layers 9, which are designated in this case by reference signs 9-41, 9-42, 9-43, 9-44.

In detail, in the embodiment of ultrasonic actuator 1 represented in FIG. 4, a first primary waveguide resonator 2-41, a first auxiliary waveguide resonator 4-41, a second primary waveguide resonator 2-42, a second auxiliary waveguide resonator 2-42, a third primary waveguide resonator 2-43 and a third auxiliary waveguide resonator 2-43 are arranged alternatingly when viewed in the Y direction. In this arrangement: first primary waveguide resonator 2-41 is arranged between first and second auxiliary waveguide resonators 4-41, 4-42, and second primary waveguide resonator 2-42 is arranged between second and third auxiliary waveguide resonators 4-42, 4-43. One primary generator 3-41 or 3-42 is in flat contact with each of primary waveguide resonators 2-41, 2-42, and one auxiliary generator 5-41 or 5-42 is in flat contact with each of auxiliary waveguide resonators 4-41, 4-42 and 4-43. One primary waveguide resonator and one auxiliary waveguide resonator are each connected to each other via one crosspiece, so four crosspieces 6-41, 6-42, 6-43 and 6-44 are present.

First primary waveguide resonator 2-41 is connected with reference to the Y direction laterally in a first direction (positive Y direction) to first friction track 8-41 on first auxiliary waveguide resonator 4-41 via a first crosspiece 6-41, and laterally in a second direction, opposite to the first direction (negative Y direction) to a second friction track 8-42 on second auxiliary waveguide resonator 4-42 via a second crosspiece 6-42, so that first crosspiece 6-41 is situated between first primary waveguide resonator 2-41 and first auxiliary waveguide resonator 4-41. Second primary waveguide resonator 2-42 is also connected in the direction of a first direction (positive Y direction) to second auxiliary waveguide resonator 2-42 via a third crosspiece 6-43 and in the direction of a second direction opposite to the first direction (negative Y direction) to third auxiliary waveguide resonator 4-43 via fourth crosspiece 6-44, so that third crosspiece 6-43 is situated between second auxiliary waveguide resonator 4-42 and second primary waveguide resonator 2-42, and fourth crosspiece 6-44 is situated between second primary waveguide resonator 2-42 and third auxiliary waveguide resonator 4-43.

Positioning element 7 further comprises four friction layers 9-41, 9-42, 9-43 and 9-44, which are arranged such that, when positioning element 7 is in the operating state, friction layers 9-41, 9-42, 9-43 and 9-44 are each supported respectively on a friction track 8-41 or 8-42 or 8-43 or 8-44, and are in operative connection and frictional contact therewith.

On the basis of the embodiments illustrated, according to the invention an ultrasonic actuator 1 is thus provide for a linear ultrasonic motor for driving a positioning element 7, which is pressed along at least one friction track 8 with a predefined force F in the ultrasonic motor to effect a linear movement thereof. In this context, ultrasonic actuator 1 comprises:

at least one primary waveguide resonator 2, with each of which one primary generator 3 is in flat contact in order to form an acoustic standing wave, at least one auxiliary waveguide resonator 4, with each of which one auxiliary generator is in contact in order to form an acoustic standing wave, at least one crosspiece 6, wherein each of the at least one crosspieces 6 connects one of the at least one primary waveguide resonators 2 and one of the at least one auxiliary waveguide resonators 4 to each other at least in sections, and wherein at least one friction track 8 or friction rail 41 is arranged on the crosspiece 6, wherein the at least one primary waveguide resonator 2 and the at least one auxiliary waveguide resonator 4 are designed as an open linear waveguides, and the at least one crosspiece 6 functions as a totalising device of the acoustic standing waves propagated in the primary and auxiliary waveguide resonators 2, 4, so that the at least one crosspiece 6 functions as the generator of a simulated travelling wave, which is usable for driving positioning element 7.

The embodiments show that ultrasonic actuator 1 according to the invention may comprise a variable number of primary and auxiliary waveguide resonators 2 and 4 and a corresponding number of crosspieces 6.

FIG. 5 shows a perspective view of ultrasonic actuator 1 with a primary waveguide resonator 2, a primary generator 3 arranged thereon, an auxiliary waveguide resonator 4 and an auxiliary generator 5 arranged thereon. FIG. 6 shows a top view of the ultrasonic actuator 1 of FIG. 5, while FIG. 7 shows the side view of the ultrasonic actuator 1 of FIG. 5. FIG. 8 shows ultrasonic actuator 1 of FIG. 5 from below.

In the suggested invention, length La of primary waveguide resonator 2 (see FIG. 6) may be an integral multiple of half of wavelength $\lambda$, of the acoustic standing wave generated therein, i.e., $La=n\lambda/2$, wherein n may be an integer 1, 2, 3, 4, 5 and so on. Length Lb of auxiliary waveguide resonator 4 is equal to length La of primary waveguide resonators 2, i.e. $La=Lb$.

Widths Wa and Wb of primary and auxiliary waveguide resonators 2 and 4 are smaller than or equal to half the wavelength $\lambda$, of the generated acoustic wave, i.e. $Wa=Wb \leq \lambda/2$.

Thicknesses Ta and Tb of primary and auxiliary waveguide resonators 2 and 4 are smaller than or equal to half the wavelength $\lambda$, of the generated acoustic wave, i.e., $Ta=Tb \leq \lambda/2$.

Auxiliary waveguide resonators 4 are spatially offset in the X direction relative to primary waveguide resonators 2 by a distance d that is equal to a quarter of the wavelength of the generated acoustic standing wave, i.e., $d=\lambda/4$.

Crosspieces 6 may be designed such that Length B thereof is smaller than Length La of the primary waveguide resonator, by a value equal to 1¼ times a wavelength $\lambda$, of the generated acoustic standing wave, i.e., $La-B=1.25\lambda$.

Width C of each crosspiece 6 may be selected such that it is smaller than or equal to half of wavelength $\lambda$, of the generated acoustic standing wave, i.e., $C \leq \lambda/2$.

Thickness t of each crosspiece 6 may be designed such that it is smaller than half the thickness Ta or Tb of waveguide resonators 2 and 4, i.e., $t<Ta/2=Tb/2$.

FIG. 9 shows a perspective view of an ultrasonic actuator 1 with one primary waveguide resonator 2 and two auxiliary waveguide resonators 4. FIG. 10 shows a top view of ultrasonic actuator 1 of FIG. 9. FIG. 11 shows a side view of ultrasonic actuator 1 of FIG. 9, and FIG. 12 is a view of ultrasonic actuator 1 of FIG. 9 from below.

In an exemplary embodiment of the present invention, primary and auxiliary waveguide resonators each have the same structural design.

Figure 13:
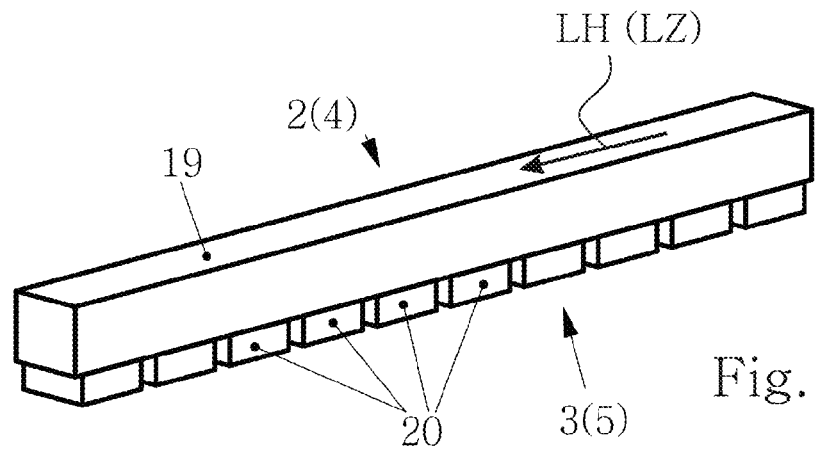
FIG. 13 is a representation of an embodiment of a primary waveguide resonator or auxiliary waveguide resonator with an associated generator that is created from piezoelectric parts.

FIG. 13 shows one of the structural variants of primary or auxiliary waveguide resonators 2, 4. In this variant, primary or auxiliary waveguide resonator 2, 4 consists of resonant rod or resonant plate 19, and generator for acoustic standing wave 3 or 5 connected therewith.

Rod or plate 19 may be produced from metal such as steel, bronze, aluminium. They may also be manufactured from oxide ceramic on a basis of aluminium oxide or another hard, abrasion resistant ceramic or metal ceramic. It is also possible to manufacture them from polymer materials that are resistant to high temperatures, filled with hard particles of, for example glass, aluminium oxide, zirconium oxide or similar. Hard, strong fibres of glass, carbon or a similar material may also be used as filler substances for the polymer material.

Generators 3 or 5 of the acoustic standing wave may have the form of a series of differently polarized piezoelements 20 that are fastened to resonant rod or plate 19 in the area of maximum mechanical vibration of the acoustic standing wave propagated therein.

Figures 14, 15:
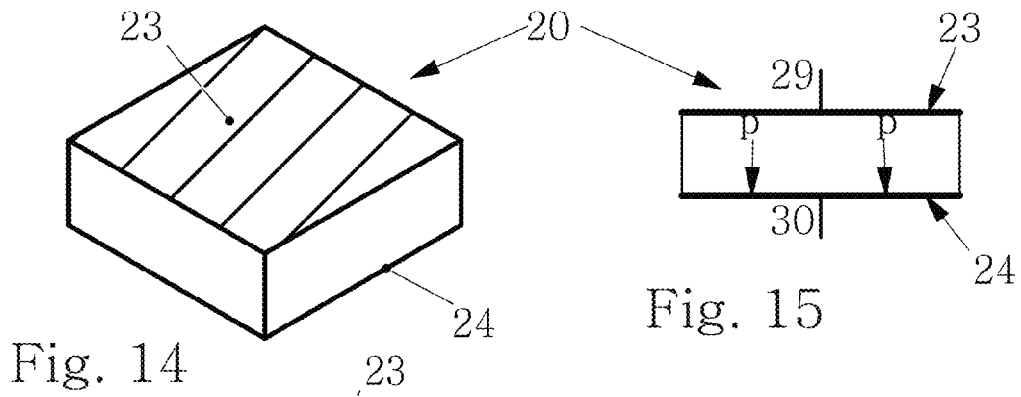
FIGS. 14 to 19 are representations of various embodiments of a piezoelectric part that may be used to create a generator on a primary waveguide resonator or an auxiliary waveguide resonator according to FIG. 13.
Figures 16, 17:
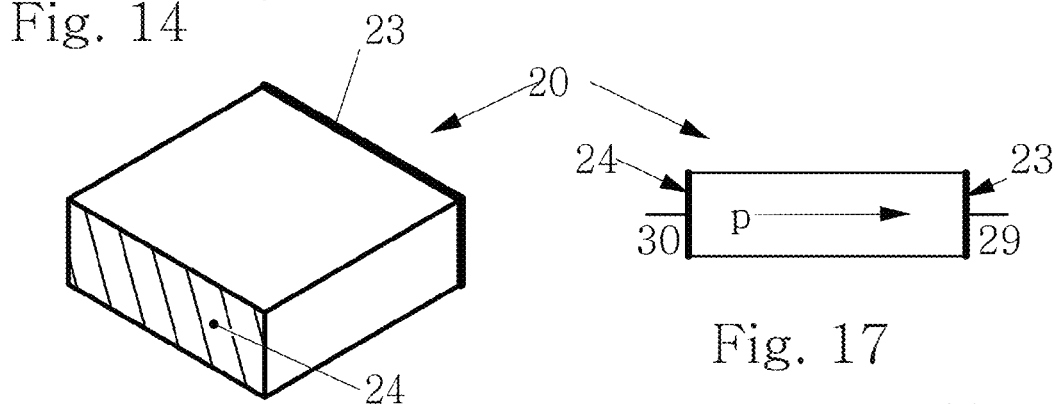
Figures 18, 19:
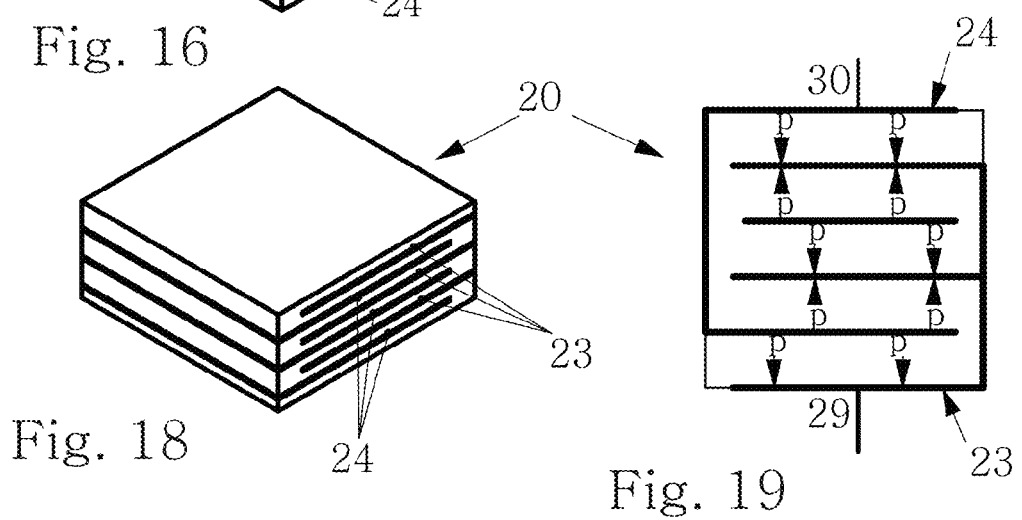

Piezoelements 20 may be manufactures as transversely polarized platelets (see FIGS. 14, 15), as longitudinally polarized platelets (see FIGS. 16, 17), or as multilayer piezoelements (see FIGS. 18, 19). In such cases, electrodes 23, 24 have connectors 29, 30.

Figure 20:
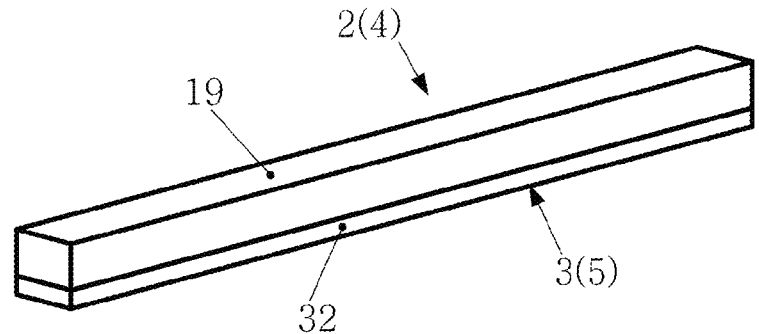
FIG. 20 is a representation of another embodiment of a primary waveguide resonator or auxiliary waveguide resonator with an associated generator that is created from piezoelectric parts for comparison with the representation of FIG. 13.

FIG. 20 shows another variant of primary or auxiliary waveguide resonator 2 or 4. In this variant, the generator of acoustic wave 3 or 5 is a piezoelectric plate 32.

Figure 21:
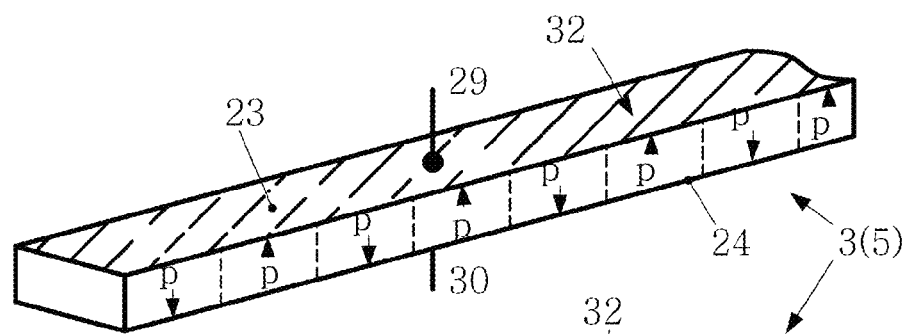
FIGS. 21 to 23 are representations of further embodiments of a piezoelectric part that may be used to create a generator on a primary waveguide resonator or an auxiliary waveguide resonator according to FIG. 20.
Figure 22:
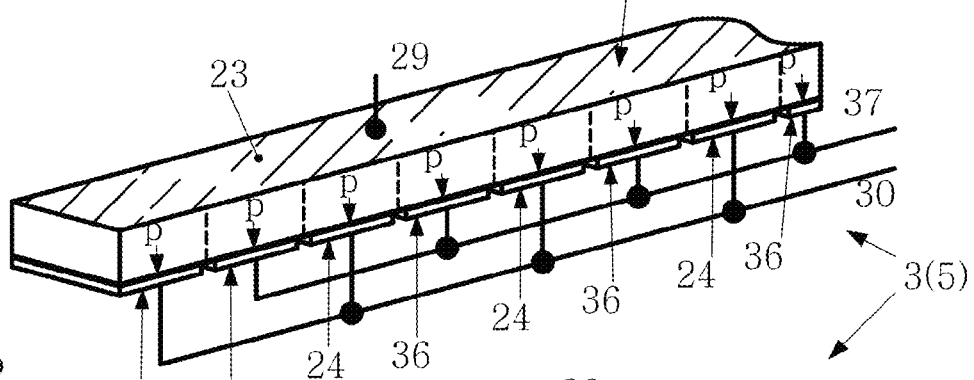
Figure 23:
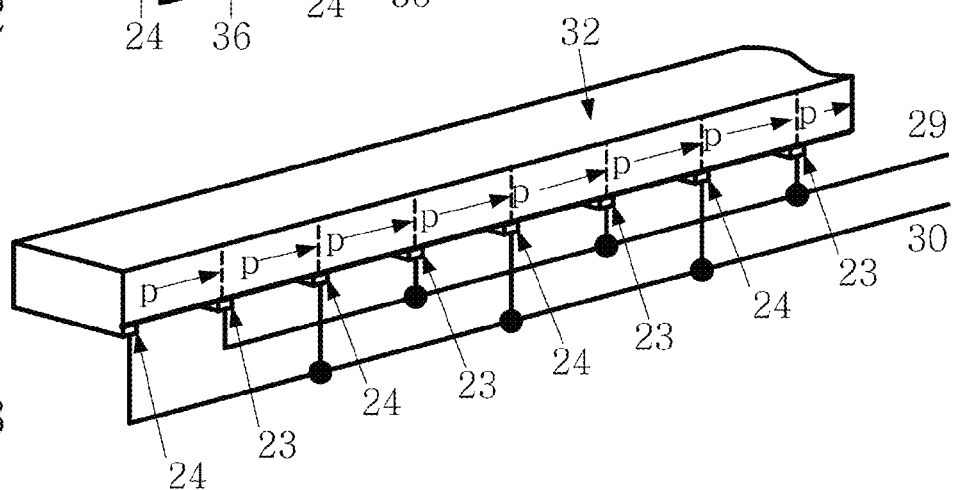

In FIG. 21, electrodes 23, 24 pass through plate 32, wherein adjacent areas of piezoelectric plate 32 have oppositely aligned (cross) polarity. In FIG. 22, adjacent areas of piezoelectric plate 32 have parallel (cross) polarity. In this context, the electrode may be one general passthrough electrode 23, split electrodes 24, 36, that are actuated in opposite phases, with the corresponding opposite-phase connections 30 and 37. According to FIG. 23, adjacent areas of piezoelectric plate 32 have a parallel (longitudinal) polarity.

Generators 3 and 5 are connected to waveguide resonators 2 and 4 by a solid adhesive—for example an epoxy resin or similar adhesive base.

In the invention according to the described embodiment, crosspieces 6 may be designed as individual parts that are joined to each other adhesively or by soldering, or are attached adhesively to the lateral surfaces of waveguide resonators 2 and 4.

Crosspieces 6 may be manufactured from heat-treated steel or bronze, hard oxide ceramic on a basis of aluminium oxide metal ceramic. They may also be made from a hard, heat-resistant polymer material enriched with particles of a hard material such as glass, aluminium oxide, zirconium oxide or similar. Hard, strong fibres of glass, carbon and similar materials may also be used as filler substances for the polymer material.

The present invention also provides for crosspieces 6 that are manufactured from the same material as resonators 2, 4 and are integral therewith.

For driving positioning element 7 crosspiece 6 comprises a friction track 8, which is in operative connection and frictional contact with positioning element 7 via the frictional surface of said friction track.

Friction track 8 is applied to the surface of crosspiece 6 as a thin layer of a durable, abrasion-resistant material. A layer of a durable, abrasion-resistant glass or a glass enriched with particles of a hard, abrasion-resistant material may be used as the material for friction track 8. A layer of electromechanically or chemically deposited nickel and chromium may also be used. In addition, a layer consisting of aluminium oxide or zirconium oxide deposited from the plasma phase, may be applied, or a layer containing small diamond crystals deposited from the gas phase may be used. Layers in the form of thin coatings of CrN, CrCN, (Cr,W)N, (Cr,Al)N, NbN—CrN, TiN, TiCN, (Ti,Al)N, V2O5 and similar may also be used.

Figure 24:
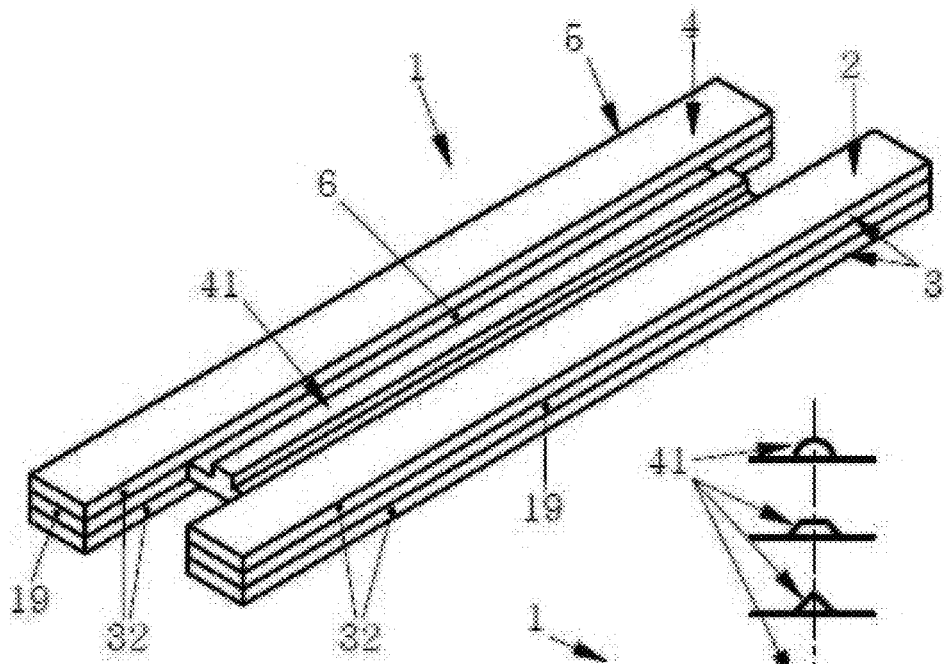
FIGS. 24 to 26 are representations of a further embodiment of the ultrasonic actuator according to the invention, which is comparable to the embodiment of the ultrasonic actuator of FIG. 1 in terms of the number of primary or auxiliary waveguide resonators.
Figure 25:
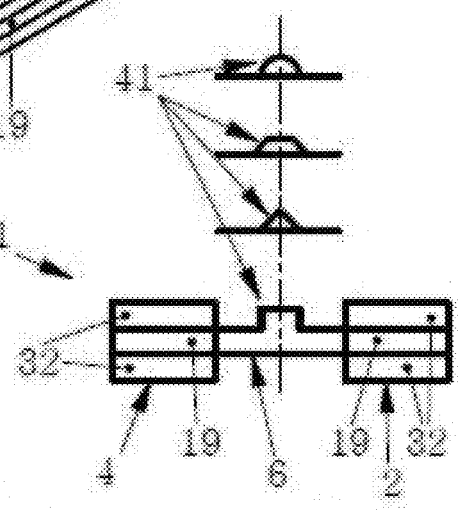
Figure 26:
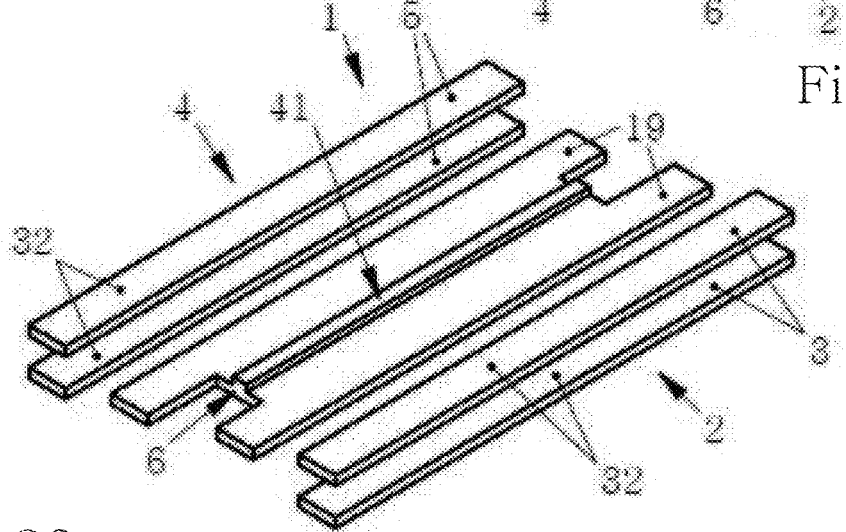
Figure 35:
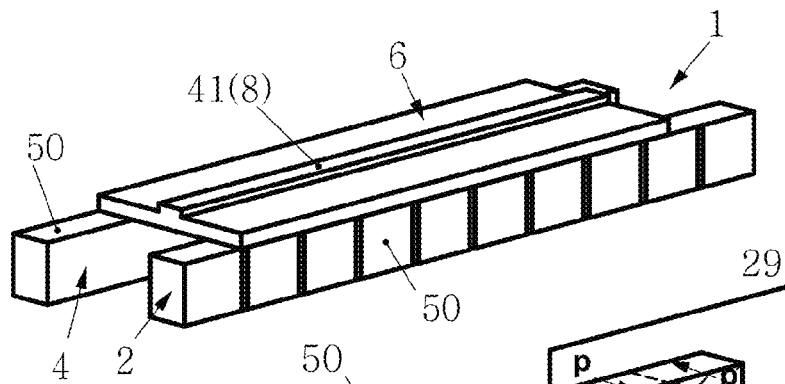
FIG. 35 is a representation of a further embodiment of the ultrasonic actuator according to the invention, which is comparable in terms of the number of primary or auxiliary waveguide resonators to the embodiment of the ultrasonic actuator of FIG. 1, wherein the primary and the auxiliary waveguides are each designed as active waveguide resonators.
Figure 36:
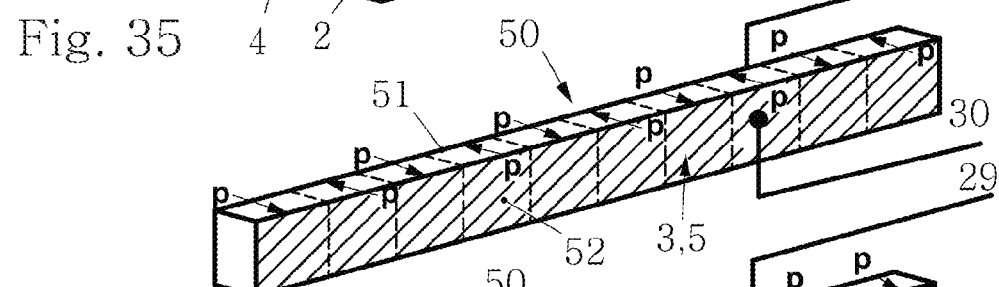
FIGS. 36 to 39 show various embodiments of generators with piezoelectric parts, each of which may be used on a primary waveguide resonator or an auxiliary waveguide resonator, particularly in an ultrasonic actuator according to FIG. 20.
Figure 37:
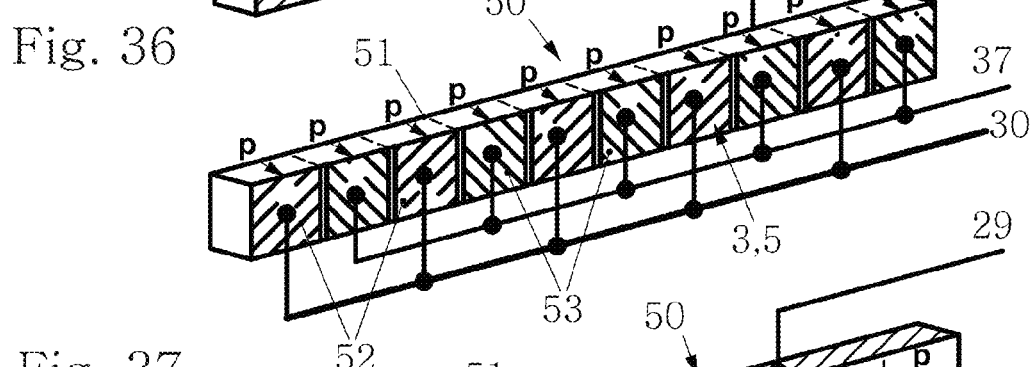
Figure 38:
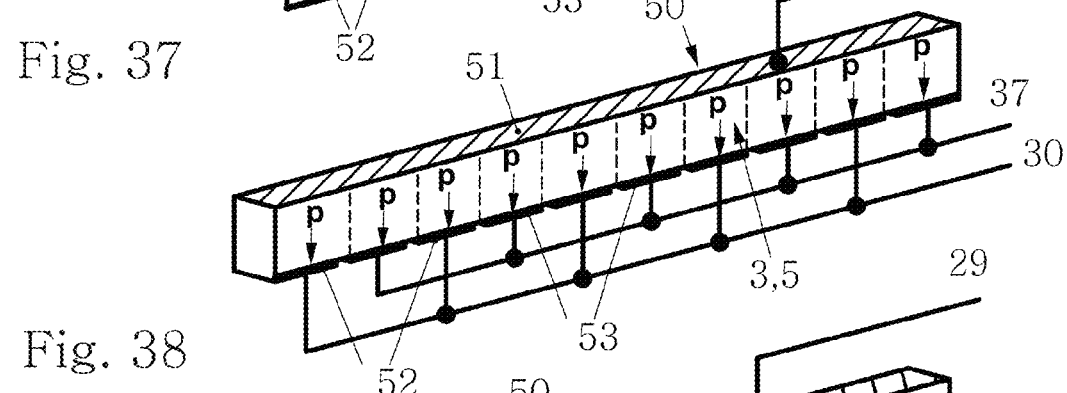
Figure 39:
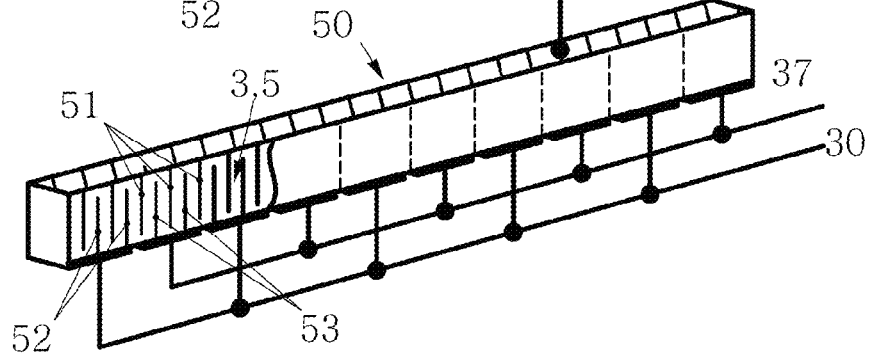
Figure 40:
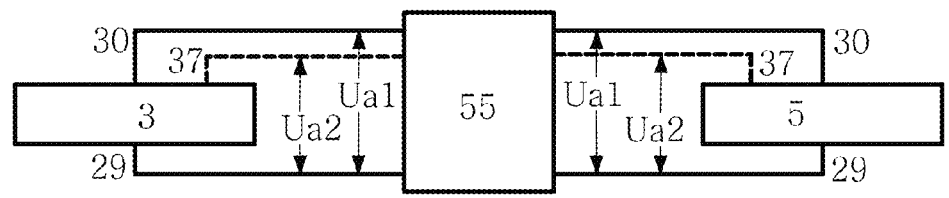
FIGS. 40 to 44 show various embodiments of a connection diagram of generators of the ultrasonic actuator, each having an electric excitation device.
Figure 41:
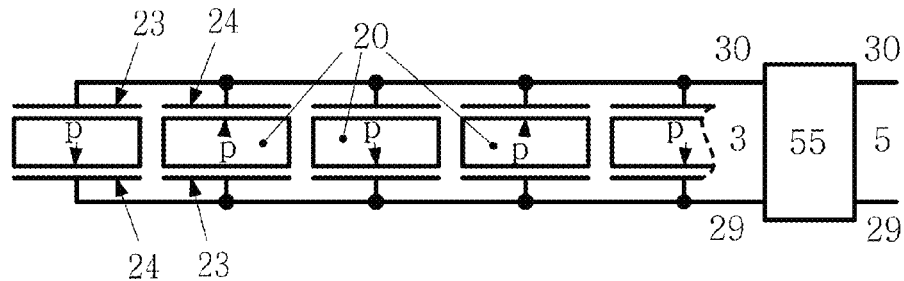
Figure 42:
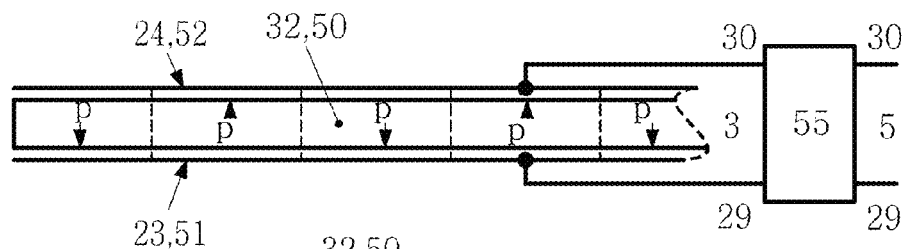
Figure 43:
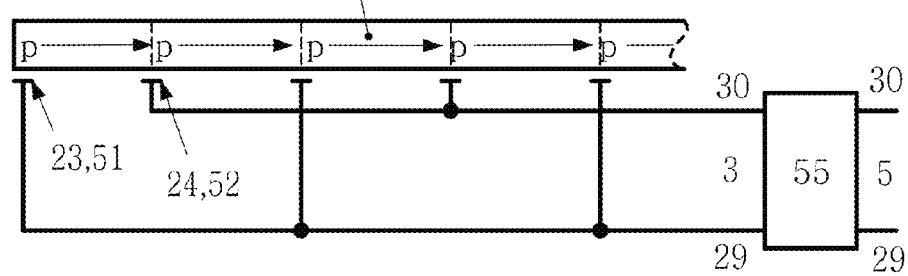
Figure 44:
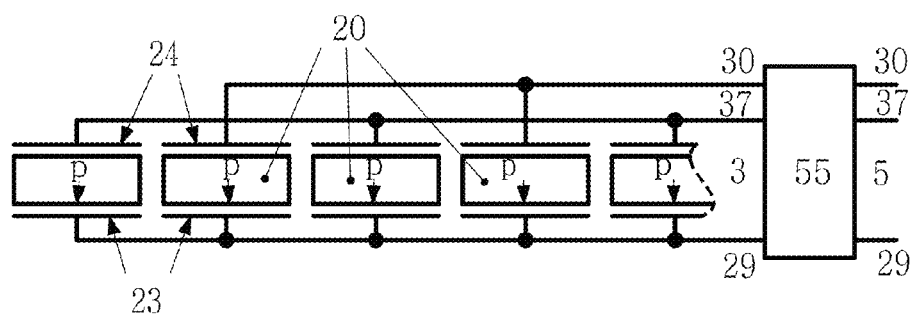

FIGS. 24 to 26 show various views of ultrasonic actuator 1, in which generators 3, 5 and waveguide resonators 2, 4 are configured in a layer structure consisting of two piezoelements 32 (generators) arranged on different sides of the resonant rod or plate 19 (resonators). FIG. 25 is a side view of such an ultrasonic actuator 1, and FIG. 26 shows the ultrasonic actuator 1 of FIG. 24 in the disassembled state.

In the present invention, crosspiece 6 of ultrasonic actuator 1 may comprise a friction guidance rail 41, the friction surface of which sets positioning element 7 in motion and at the same time assures perfectly linear motion.

Friction guidance rail 41 may be rectangular, triangular, trapezoidal or round, or any other shape that assures the linear motion of positioning element 7 (see FIG. 25).

Friction guidance rail 41 may be made from the same material as crosspiece 6, or it may be integral therewith (see FIGS. 24 to 26). Moreover, friction guidance rail 41 may have the form of a plate made from a hard, abrasion-resistant material that is connected to crosspiece 6. Hardened steel, ceramic on an aluminium oxide and zirconium oxide basis, metal ceramic or similar may be used as the material for such a friction guidance rail 41.

The invention also provides for the design of an ultrasonic actuator in a V- or U-shape, as represented in FIGS. 27 to 34.

In ultrasonic actuator 1 according to the invention, primary and auxiliary waveguide resonators 2 and 4 may also be designed as active waveguide resonators 50 for acoustic standing waves, and made from piezoceramic ceramic, for example, see FIGS. 35 to 39. In waveguide resonators of such kind, the generators of acoustic waves 3 and 5 are constructed as electrodes 51, 52, 53 and a piezoceramic layer therebetween. Electrodes 51, 52, 53 are applied to the surface of waveguide resonators 50 or arranged inside the resonators.

Crosspiece 6 is attached to waveguide resonators 50 by adhesion with a solid adhesive, e.g., an adhesive based on epoxy resin or another, similar adhesive.

FIGS. 40 to 44 show the connection diagrams of generators 3 and 5 of the ultrasonic actuator 1 with electric excitation device 55.

Electric excitation device 55 supplies the two periodic electrical voltages Ua1 and Ub1 with the same amplitude, the frequency of which is the same as the frequency of the acoustic standing waves generated in waveguide resonators 2 and 4. Voltages Ua1 and Ub1 are phase-shifted with respect to each other by an angle of +90° or −90°.

Electric excitation device 55 may also supply the four periodic voltages Ua1, Ub1 and Ua2, Ub2 at the same frequency. Voltages Ua1 and Ub1 are phase-shifted with respect to each other by an angle of +90° or −90°, and voltages Ua2 and Ub2 are in phase opposition to voltages Ua1 and Ub1.

Voltages Ua1, Ub1, Ua2 and Ub2 may have a sinus, sawtooth, trapezoid or rectangular shape, or also any other shape.

FIGS. 45 and 46 show the phase with maximum deformation of waveguide resonator 2 or 4 with an acoustic bending standing wave propagating therein.

FIGS. 47 and 48 show the phase with maximum deformation of waveguide resonator 2 or 4 with an acoustic longitudinal standing wave propagating therein.

Figure 49:
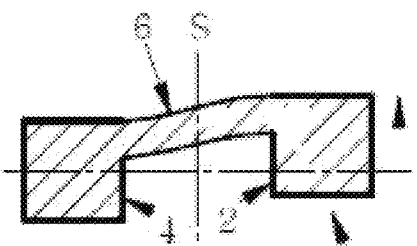
FIGS. 49 to 52 each show a cross-section of an embodiment of the ultrasonic actuator according to the invention in a total of two deformation phases for a normal cross section of ultrasonic actuator 1 for the event that an acoustic bending standing wave is formed in an ultrasonic actuator with a primary waveguide resonator or an auxiliary waveguide resonator according to FIG. 1.
Figure 51:
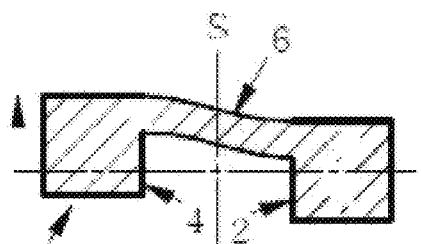
Figure 50:
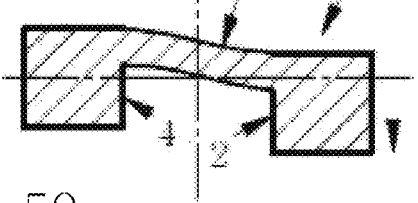
Figure 52:
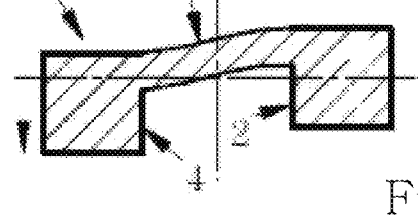

FIGS. 49 and 50 show two deformation phases for a normal cross section of ultrasonic actuator 1 during generation of an acoustic bending standing wave in waveguide resonator 2. FIGS. 51 and 52 show two deformation phases for a normal cross section of ultrasonic actuator 1 during generation of an acoustic bending standing wave in waveguide resonator 4.

Figure 53:
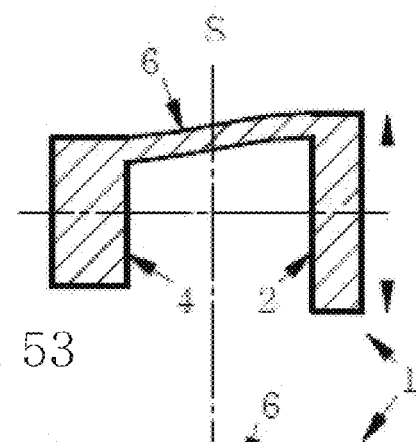
FIGS. 53 to 56 each show a cross-section of an embodiment of the ultrasonic actuator according to the invention in a total of two deformation phases for a normal cross section of ultrasonic actuator 1 for the event that an acoustic lengthwise standing wave in an ultrasonic actuator with a primary waveguide resonator or an auxiliary waveguide resonator according to FIG. 1.
Figure 55:
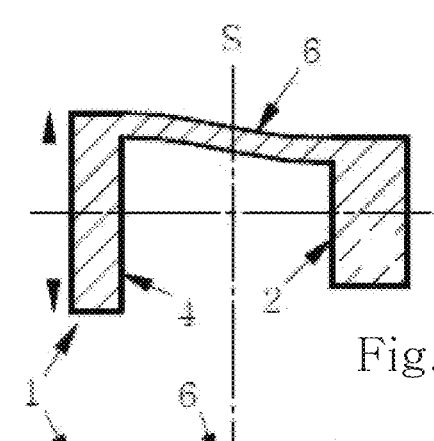
Figure 54:
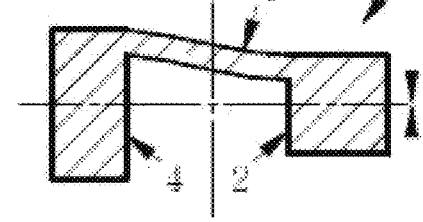
Figure 56:
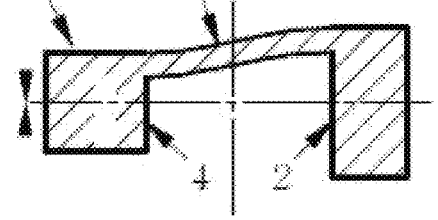

FIGS. 53 and 54 show two deformation phases for a normal cross section of ultrasonic actuator 1 during generation of an acoustic longitudinal standing wave in waveguide resonator 2, and FIGS. 55 and 56 show two phases with maximum deformation for a normal cross section of ultrasonic actuator 1 during generation of an acoustic longitudinal standing wave in waveguide resonator 4.

The deformations illustrated in FIGS. 49 to 52 and 53 to 56 show that the deformation of waveguide resonator 2 or 4 caused by the standing wave leads to a deformation of crosspiece 6. In other words, the acoustic wave propagating in waveguide resonator 2 or 4 is transferred in part to crosspiece 6. In this situation, the amplitude of the acoustic wave propagating in crosspiece 6 is slowly attenuated as it gets farther from the waveguide resonator 2 or 4 that supplies the stimulus. Since the normal cross section of ultrasonic actuator 1 is symmetrically about axis of symmetry S, the acoustic standing waves that are transferred to crosspiece 6 from waveguide resonator 2 and the acoustic standing waves that are transferred to crosspiece 6 from waveguide resonator 4 have the same transverse amplitudes longitudinally along axis of symmetry S.

When waveguide resonators 2 and 4 are excited at the same time, the acoustic standing waves from primary waveguide resonator 2 and from auxiliary waveguide resonator 4 that are transferred to crosspiece 6 are totalized therein. That is to say, crosspiece 6 functions as a totalizing device for the acoustic standing waves that pass from waveguide resonators 2 into the crosspiece.

Since waveguide resonators 2 and 4 are separated spatially from one another by a distance d that is equal to $\lambda/4$, the acoustic standing waves propagating in the crosspiece are also offset spatially from each another by distance $\lambda/4$.

The acoustic standing waves are generated waveguide resonators 2 and 4 by periodic voltages Ua1 Ub1, which are phase-shifted with respect to each other by an angle of +90° or an angle of −90, and consequently the acoustic standing waves generated by these voltages are also phase-shifted with respect to each other by an angle of +90° or an angle of −90.

The acoustic standing waves generated as explained previously in waveguide resonators 2, 4 are superimposed on each other in crosspiece 6, and as a result of the superposition or totalizing of said two standing waves a wave is formed along axis of symmetry S that has similar properties to a travelling wave. Since this wave is formed in an open waveguide and not in a closed or infinite waveguide, this wave is not a travelling wave in the conventional sense, but is to be understood as a simulated travelling wave. Crosspiece 6 is the generator of this simulated travelling wave.

Figure 57:
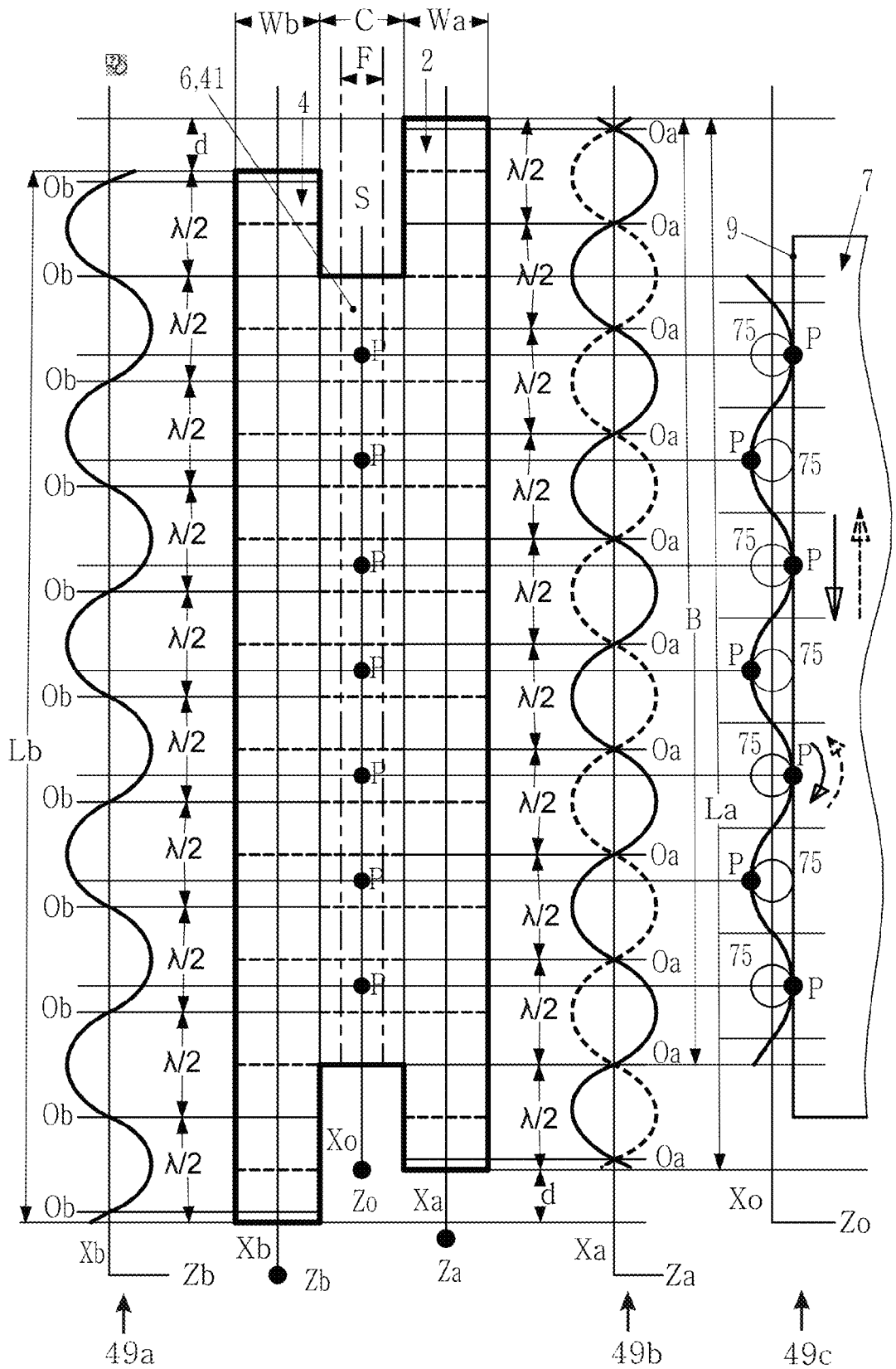
FIG. 57 is a representation to explain the functional principle of the ultrasonic actuator according to the invention using the example of the generation of acoustic bending standing waves generated in a primary waveguide resonator or an auxiliary waveguide resonator.
Figure 58:
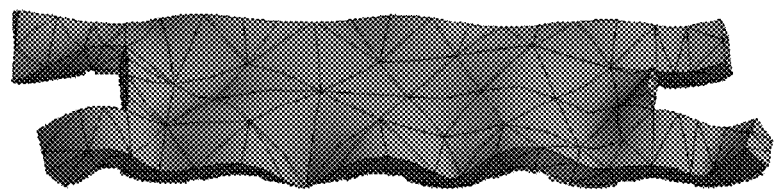
FIGS. 58 to 61 are representations of a combination of a primary waveguide resonator and an auxiliary waveguide resonator in the embodiment of the ultrasonic actuator of FIG. 1, wherein the ultrasonic actuator reaches a state of maximum deformation in each case.
Figure 59:
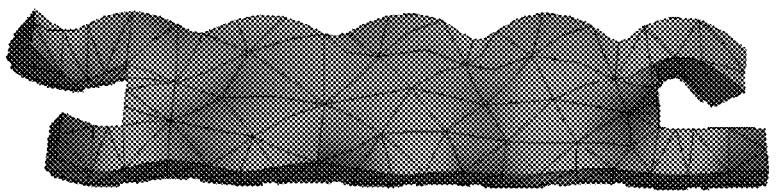
Figure 60:
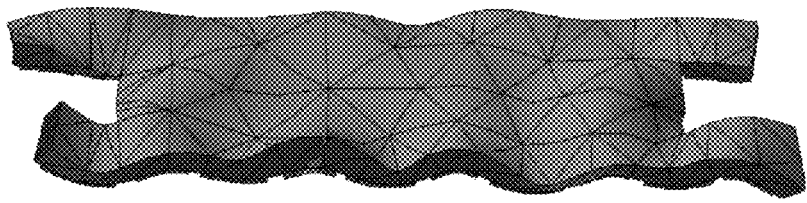
Figure 61:
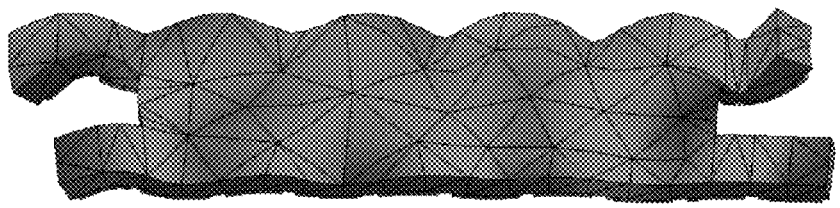

FIG. 57 explains the functional principle of the ultrasonic actuator according to the invention using the example of the generation of acoustic bending standing waves in waveguide resonators 2 and 4 of ultrasonic actuator 1. In this case, waveguide resonators 2 and 4 oscillate in planes XaZa and XbZb. FIGS. 49*a* and 49*b* show the distribution of the oscillation amplitudes on axes Xa and Xb. FIGS. 57*a* and 57*b* show the deformation at the point in time when the amplitudes of both standing waves are identical. The minima of the oscillating speeds of the standing wave generated in waveguides 2 and 4 are located on lines Oa and Ob.

The simulated travelling wave represented in FIG. 57*c* is generated in crosspiece 6 by the transformation of the deformation of the two acoustic standing waves from waveguide resonators 2 and 4 into crosspiece 6. The formation of this wave causes points P located in plane XoZo on the surface of crosspiece 6 to move in circular trajectories along axis of symmetry S(Xo). In the event of a shift to right or left relative to axis S, the trajectories of the points on the surface of crosspiece 6 become elliptical and ultimately a straight line (not shown in the drawing).

For optimized function of the ultrasonic actuator according to the invention and of an ultrasonic motor equipped therewith, it is advantageous for width F of friction track 8 of the width of friction guidance rail 41 to be smaller than or equal to half the width C of crosspiece 6, i.e., $F \leq \frac{1}{2} C$.

In this case, the points on crosspiece 6 (friction track 8 or friction guidance rail 41) transfer the tractive force optimally to friction layer 9 of positioning element 7 due to the corresponding frictional contact. Under the effect of the tractive force applied, positioning element 7 moves in one direction or the other. The direction of motion is determined by the direction of motion of the travelling wave, i.e., by the phase offset between the two acoustic standing waves.

FIGS. 58 to 61 show the maximum deformations of ultrasonic actuator 1 with one primary and one auxiliary waveguide resonator 2 and 4, calculated by simulation.

Figure 62:
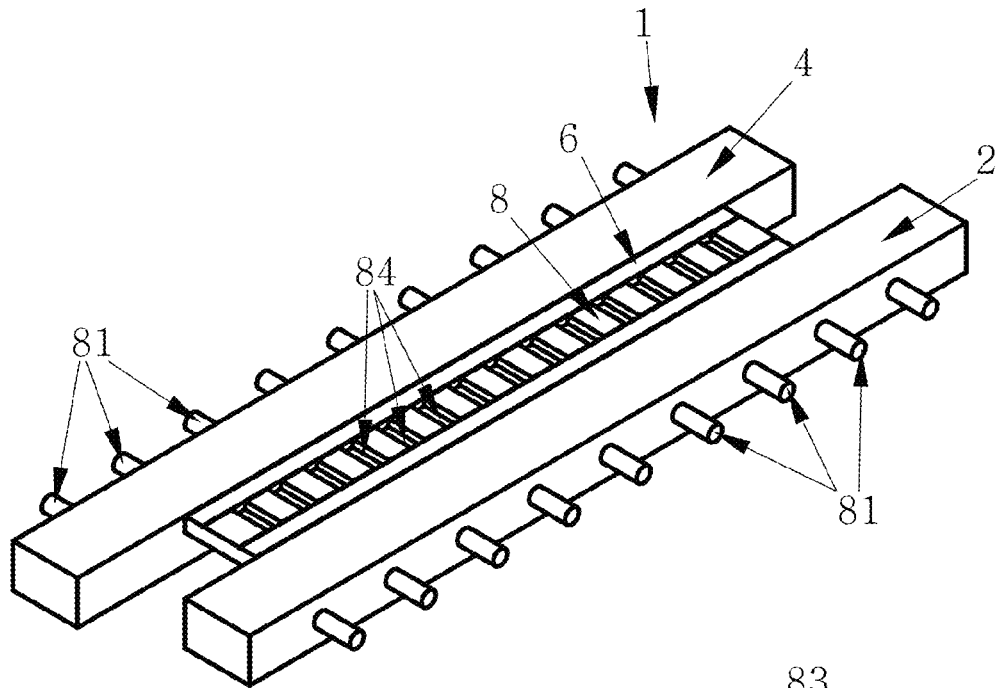
FIG. 62 is a representation of a further embodiment of the ultrasonic actuator according to the invention, which is comparable to the embodiment of the ultrasonic actuator of FIG. 1 in terms of the number of primary or auxiliary waveguide resonators, wherein the ultrasonic actuator comprises fastening elements.

FIG. 62 shows an ultrasonic actuator 1 according to the invention, comprising fastening elements 81, each of which is arranged at the minimum of the oscillating speeds of waveguide resonators 2 and 4 on lines Oa and Ob.

Figure 63:
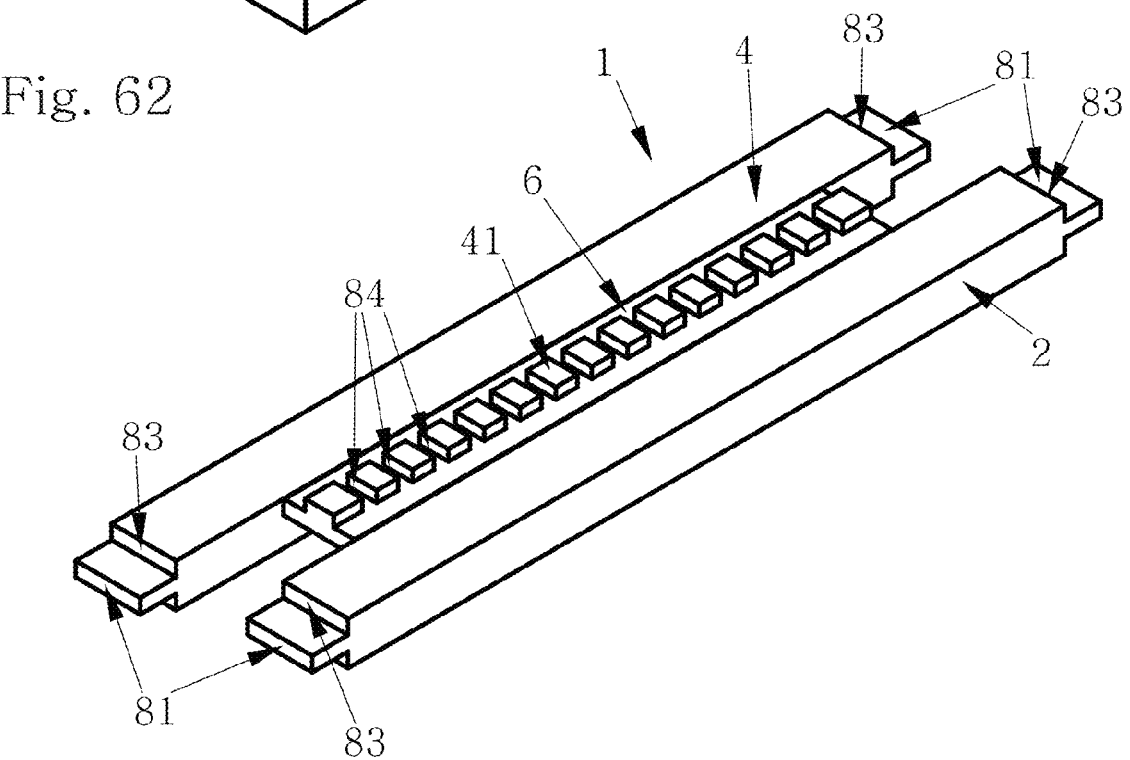
FIG. 63 is a representation of a further embodiment of the ultrasonic actuator according to the invention, which is an alternative solution to the ultrasonic actuator of FIG. 62 and is comparable to the embodiment of the ultrasonic actuator of FIG. 1 in terms of the number of primary or auxiliary waveguide resonators, wherein the ultrasonic actuator comprises fastening elements.

FIG. 63 shows an ultrasonic actuator 1 according to the invention, comprising fastening elements 81 that are arranged on the frontal faces 83 of waveguide resonators 2 and 4.

In the ultrasonic motor according to the invention, friction track 8 of ultrasonic actuator 1 or friction guidance rail 41 may comprise the transverse slots 84 shown in FIGS. 62 and 63.

Figure 64:
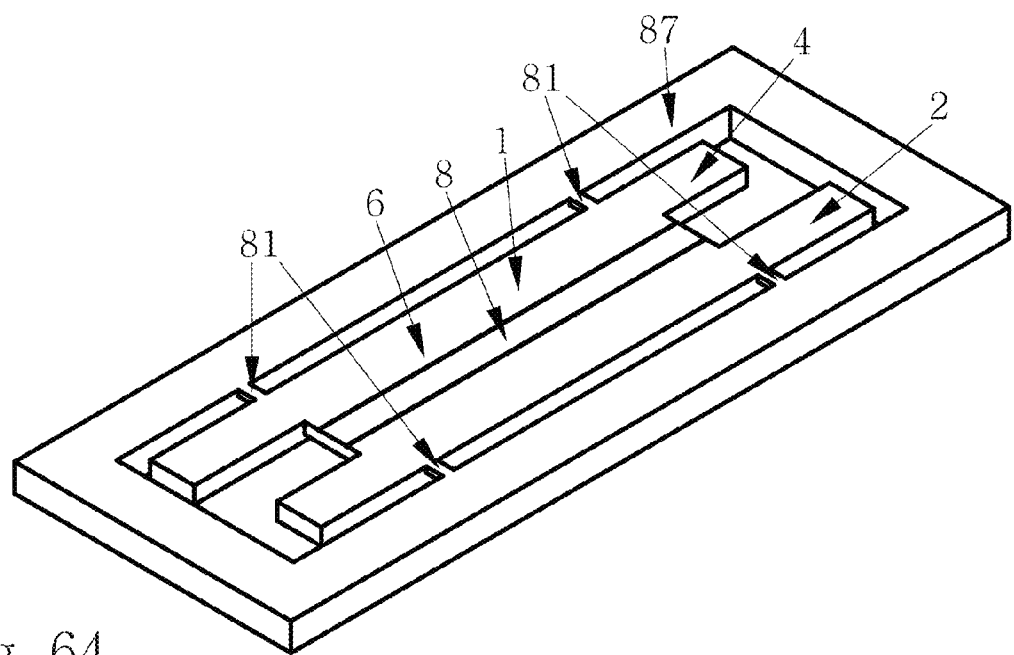
FIG. 64 is a representation of a frame element for retaining the embodiment of the ultrasonic actuator according to the invention of FIG. 1.
Figure 65:
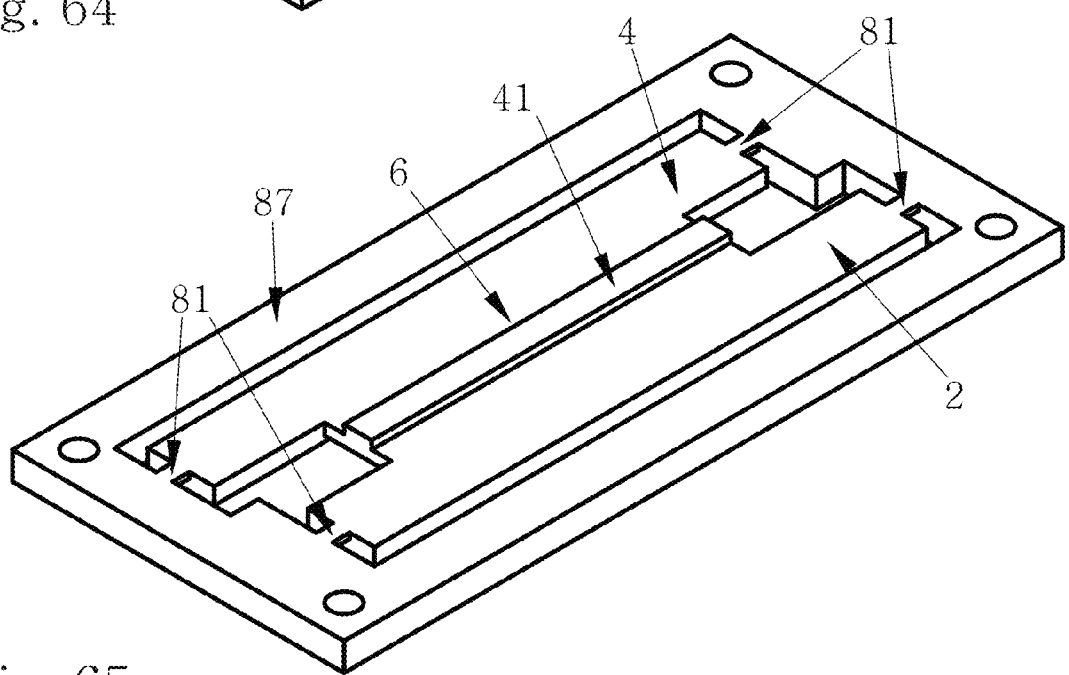
FIG. 65 is an embodiment of the frame element that is an alternative solution to the frame element represented in FIG. 64.

FIGS. 64 and 65 show two fastening variants of ultrasonic actuator 1.

In the first case according to FIG. 64, holder 87 of ultrasonic actuator 1 comprises a frame or the motor housing surrounding the actuator (housing not represented), in which it is retained by means of fastening elements 81 at the points of minimum oscillating speed of waveguide resonators 2, 4. In this case, holder 87 and fastening elements 81 are constructed integrally with each other.

In the second case according to FIG. 65, ultrasonic actuator 1 is retained in holder 87 by fastening elements 81 arranged on frontal faces 83 of waveguide resonators 2, 4. Here too, holder 87 and fastening elements 81 are constructed integrally with each other.

In the ultrasonic motor according to the invention the ultrasonic actuator has smaller dimensions than the known ultrasonic motors that work with acoustic travelling waves, and consequently the motor itself is also of smaller dimensions.

Moreover, the ultrasonic actuator according to the invention has significantly smaller inhomogeneous elliptical trajectories of the friction surface, and consequently the positioning element has a higher maximum speed of motion. The ultrasonic actuator according to the invention also develops a greater maximum tractive force. Overall, this results in increased mechanical output of the ultrasonic motor, i.e., the efficiency of the ultrasonic motors is increased, which in turn greatly expands the possible application areas therefor.

The invention claimed is:

1. An ultrasonic actuator comprising:
    at least one primary waveguide resonator in flat contact with a primary generator and operable to form an acoustic standing wave;
    at least one auxiliary waveguide resonator in contact with an auxiliary generator and operable to form an acoustic standing wave;
    at least one crosspiece connecting at least one of the at least one primary waveguide resonators and at least one of the at least one auxiliary waveguide resonators at least in sections;
    at least one of a friction track and a friction rail provided on the at least one crosspiece; and
    wherein the at least one crosspiece is a totalizing device of the acoustic standing waves propagated in the primary and auxiliary waveguide resonators and is operable to generate a simulated travelling wave to drive the positioning element.

2. An ultrasonic actuator comprising:
    at least one primary waveguide resonator being one of plate-shaped and rod-shaped and in planar contact with a primary generator being one of plate-shaped and rod-shaped and operable to form an acoustic standing wave;
    at least one auxiliary waveguide resonator being one of plate-shaped and rod-shaped and in planar contact with at least one auxiliary generator being one of plate-shaped and rod-shaped and operable to form an acoustic standing wave; and
    at least one crosspiece coupling a connecting section of the at least one primary waveguide resonator to a connecting section of the at least one auxiliary waveguide resonator at least in sections thereof, wherein the connecting sections face one another and wherein at least one of a friction track and a friction rail is arranged on the crosspiece,
    wherein the at least one crosspiece is a totalizing device of the acoustic standing waves propagated in the primary and auxiliary waveguide resonators and is operable to generate a simulated travelling wave to drive a positioning element.

3. The ultrasonic actuator according to claim 1, wherein:
    the length of the primary waveguide resonator is equal to an integral multiple of half a wavelength of an acoustic standing wave generated therein and the length of the auxiliary wave resonator is equal to a length of the primary waveguide resonator, the open linear auxiliary waveguide resonator being spatially offset relative to the primary waveguide resonator by a quarter of the wavelength of the generated acoustic standing wave and the crosspiece is shorter than the primary waveguide resonator by one and one quarter times the wavelength of the generated acoustic standing wave.

4. The ultrasonic actuator according to claim 1, wherein:
    the ultrasonic actuator comprises at least two primary waveguide resonators and a corresponding number of auxiliary waveguide resonators with crosspieces, the at least two primary waveguide resonators being operable to set the positioning element in motion.

5. The ultrasonic actuator according to claim 1, wherein:
    the primary and auxiliary open linear waveguide resonators generate at least one of:
    acoustic bending standing waves;
    acoustic longitudinal standing waves; and
    acoustic standing shear waves,
    and propagate said waves along a length of the resonators.

6. The ultrasonic actuator according to claim 1, wherein:
    the width of each crosspiece is smaller than or equal to half a wavelength of the generated acoustic standing wave formed by the primary generator.

7. The ultrasonic actuator according to claim 1, wherein:
    a thickness of each crosspiece is smaller than or equal to a quarter of a wavelength of the generated acoustic standing wave formed by the primary generator.

8. The ultrasonic actuator to claim 1, further comprising:
    piezoelements coupled to the primary and auxiliary waveguide resonators of the acoustic standing waves, where the primary and auxiliary waveguide resonators are of at least one of:
    metal;
    metal ceramic;
    oxide ceramic;
    Sital; and
    glass.

9. The ultrasonic actuator according to claim 1, wherein:
    the primary and auxiliary waveguide resonators of the acoustic standing waves include piezoceramic as active waveguide resonators and the primary waveguide and auxiliary waveguide generators of the acoustic waves are at least one of:
    electrodes applied to the surfaces of the piezoelectric resonators; and
    electrodes arranged inside said resonators.

10. The ultrasonic actuator according to claim 1, wherein the crosspiece is of the same material as the primary and the auxiliary waveguide resonators.

11. The ultrasonic actuator according to claim 1, wherein:
    the friction rail has at least one of:
    a rectangular shape;
    a triangular shape;
    a trapezoidal shape; and
    a round shape.

12. The ultrasonic actuator according to claim 1, wherein:
    at least one of the friction track and the friction rail comprises transverse slots.

13. The ultrasonic actuator according claim 1, wherein:
    the positioning element includes at least one friction layer in operative connection with the at least one of the friction track and the friction rail.

14. A linear ultrasonic generator comprising:
    an ultrasonic actuator adapted to effect a linear movement of a positioning element, the ultrasonic actuator including:
    at least one primary open linear waveguide resonator in flat contact with a primary generator and operable to form an acoustic standing wave;
    at least one auxiliary open linear waveguide resonator in contact with an auxiliary generator and operable to form an acoustic standing wave;

at least one crosspiece connecting at least one of the at least one primary waveguide resonators to at least one of the at least one auxiliary waveguide resonators at least in sections; and at least one of a friction track and a friction rail provided on the at least one crosspiece; and a guidance device for guiding the positioning element in the ultrasonic motor.

\* \* \* \* \*